US012108455B2

(12) United States Patent
Yoshioka et al.

(10) Patent No.: US 12,108,455 B2
(45) Date of Patent: Oct. 1, 2024

(54) USER APPARATUS

(71) Applicant: NTT DOCOMO, INC., Tokyo (JP)

(72) Inventors: Shohei Yoshioka, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 417 days.

(21) Appl. No.: 17/604,970

(22) PCT Filed: Apr. 24, 2019

(86) PCT No.: PCT/JP2019/017528
§ 371 (c)(1),
(2) Date: Oct. 19, 2021

(87) PCT Pub. No.: WO2020/217366
PCT Pub. Date: Oct. 29, 2020

(65) Prior Publication Data
US 2022/0225413 A1    Jul. 14, 2022

(51) Int. Cl.
*H04W 56/00* (2009.01)
*H04W 72/0446* (2023.01)
*H04W 72/566* (2023.01)
*H04W 74/0808* (2024.01)

(52) U.S. Cl.
CPC ... *H04W 74/0825* (2013.01); *H04W 72/0446* (2013.01); *H04W 72/569* (2023.01)

(58) Field of Classification Search
CPC ........... H04W 74/0825; H04W 72/569; H04W 72/0446
USPC ......................................................... 370/328
See application file for complete search history.

(56) References Cited

U.S. PATENT DOCUMENTS

| | | | |
|---|---|---|---|
| 2004/0184477 A1* | 9/2004 | Tavli ................. | H04W 52/0216 370/461 |
| 2016/0128093 A1* | 5/2016 | Lee ........................ | H04W 72/23 370/329 |
| 2020/0322972 A1* | 10/2020 | Hosseini ............... | H04W 72/23 |

OTHER PUBLICATIONS

Extended European Search Report issued in European Application No. 19925926.8 mailed on Oct. 4, 2022 (11 pages).
Huawei, HiSilicon, "UL intra-UE multiplexing between control channels", 3GPP TSG RAN WG1 Meeting #96b, R1-1905456, Xi'an, China, Apr. 8-12, 2019 (4 pages).
(Continued)

*Primary Examiner* — Sai Ming Chan
(74) *Attorney, Agent, or Firm* — Osha Bergman Watanabe & Burton LLP

(57) ABSTRACT

A user apparatus includes, a control unit configured to apply in a specific order a plurality of processing rules for determining a channel as a transmission candidate by dropping a channel or multiplexing channels and repeat the application until detecting no channel collision in a time domain, in a case where a channel associated with a first service type and a channel associated with a second service type collide with each other at least in a time domain, and for at least one of the channel associated with the first service type and the channel associated with the second service type, a plurality of channels associated with a same service type collide with each other at least in the time domain; and a transmitting unit configured to transmit, to a base station apparatus, the channel as the transmission candidate for which no channel collision is detected in the time domain.

8 Claims, 16 Drawing Sheets

(56) References Cited

OTHER PUBLICATIONS

Office Action issued in the counterpart Japanese Patent Application No. 2021-515396, mailed on Feb. 14, 2023 (6 pages).
International Search Report issued in PCT/JP2019/017528 on Jun. 25, 2019 (3 pages).
Written Opinion of the International Searching Authority issued in PCT/JP2019/017528 on Jun. 25, 2019 (4 pages).
Qualcomm Incorporated; "UCI Enhancements for eURLLC"; 3GPP TSG-RAN WG1 #96b, R1-1905020; Xi'an, China; Apr. 8-12, 2019 (9 pages).
NTT DOCOMO, Inc.; "UCI enhancements for URLLC"; 3GPP TSG RAN WG1 #96bis, R1-1904958; Xi'an, China; Apr. 8-12, 2019 (12 pages).
3GPP TS 38.300 V15.5.0; "3rd Generation Partnership Project; Technical Specification Group Radio Access Network; NR; NR and NG-RAN Overall Description; (Release 15)"; Mar. 2019 (97 pages).
3GPP TR 38.824 V16.0.0; "3rd Generation Partnership Project; Technical Specification Group Radio Access Network; Study on physical layer enhancements for NR ultra-reliable and low latency case (URLLC) (Release 16)"; Mar. 2019 (78 pages).
Office Action in the counterpart Chinese Application No. 201980095554.5, mailed May 26, 2023 (15 pages).

* cited by examiner

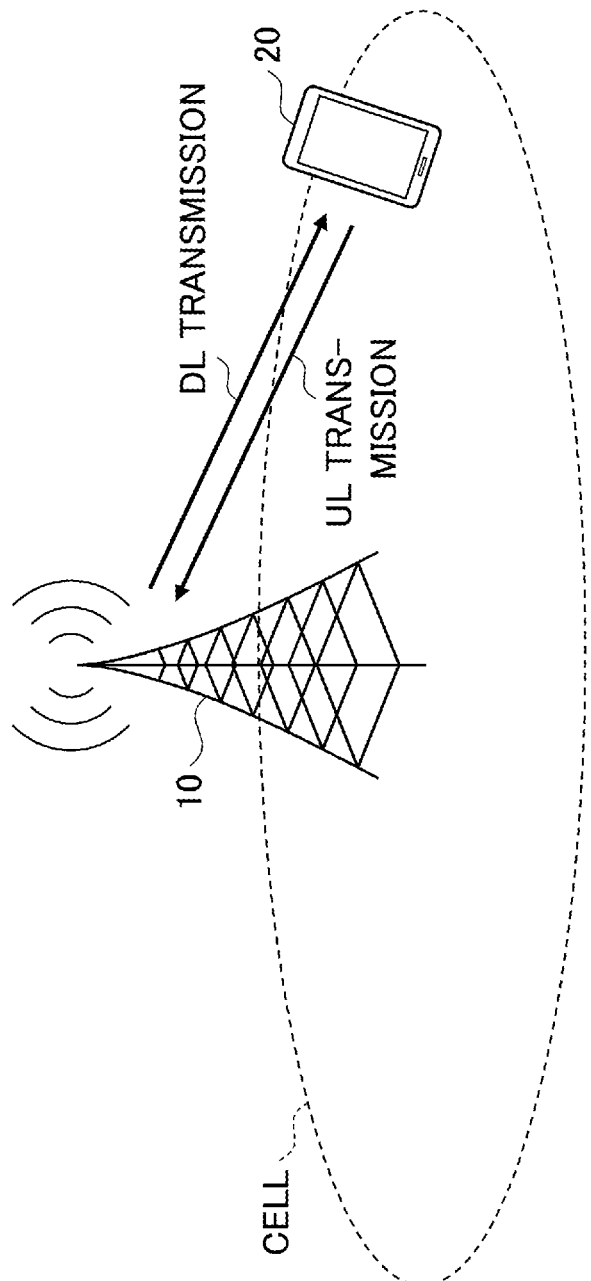

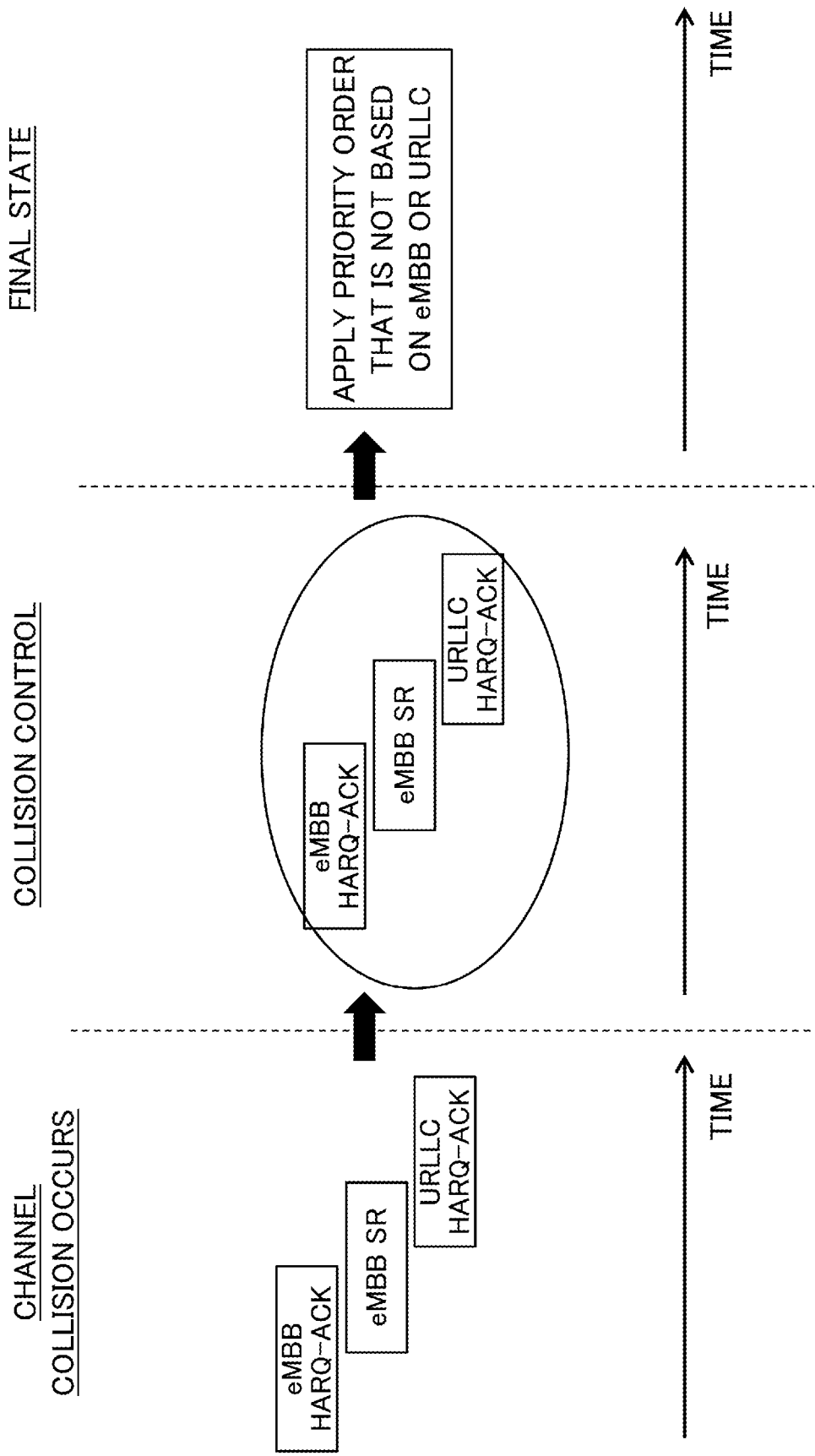

FIG.3

| | | HARQ-ACK | | | | | SR | | | CSI | | | |
|---|---|---|---|---|---|---|---|---|---|---|---|---|---|
| | | PF0 | PF1 | PF2 | PF3 | PF4 | PF0 | PF1 | | PF2 | PF3 | PF4 | |
| HARQ-ACK | PF0 | This collision does not occur since HARQ-ACKs in a slot are transmitted as one HARQ-ACK codebook | | | | | Transmit HARQ-ACK/SR on PF0 for HARQ-ACK | | | - If higher layer parameter *simultaneousHARQ-ACK-CSI* is provided, transmit HARQ-ACK/SR/CSI on HARQ-ACK PUCCH resource (*)<br>- Otherwise, CSI is dropped | | | |
| | PF1 | | | | | | - Transmit HARQ-ACK on PF1 for HARQ-ACK<br>- Drop SR | - Transmit HARQ-ACK on PF1 for HARQ-ACK,<br>• for negative SR<br>• PF1 for SR, for positive SR | | | | | |
| | PF2 | | | | | | Transmit HARQ-ACK/SR on HARQ-ACK PUCCH resource (*)(**) | | | | | | |
| | PF3 | | | | | | | | | | | | |
| | PF4 | | | | | | | | | | | | |
| SR | PF0 | (skip) | | | | | | | | (skip) | | | |
| | PF1 | | | | | | | | | | | | |
| CSI | PF2 | (skip) | | | | | Transmit CSI/SR on CSI PUCCH resource (**) | | | - If higher layer parameter *multi-CSI-PUCCH-ResourceList* with J≤2 PUCCH resources is configured, transmit CSIs on one PUCCH resource in J<br>• If coding rate is over maximum, some CSIs are dropped according to priority order<br>- Otherwise, CSI reports except the highest priority are dropped | | | |
| | PF3 | | | | | | | | | | | | |
| | PF4 | | | | | | | | | | | | |
| PUSCH | UL-SCH | Multiplex HARQ-ACK on PUSCH | | | | | Transmit PUSCH and drop positive SR | | | Multiplex CSI on PUSCH | | | |
| | A/SP-CSI | | | | | | Transmit positive SR and drop PUSCH | | | Drop CSI that would be transmitted on PUCCH (P/SP-CSI) | | | |
| | UL-SCH + A-CSI | | | | | | Transmit PUSCH and drop positive SR | | | | | | |

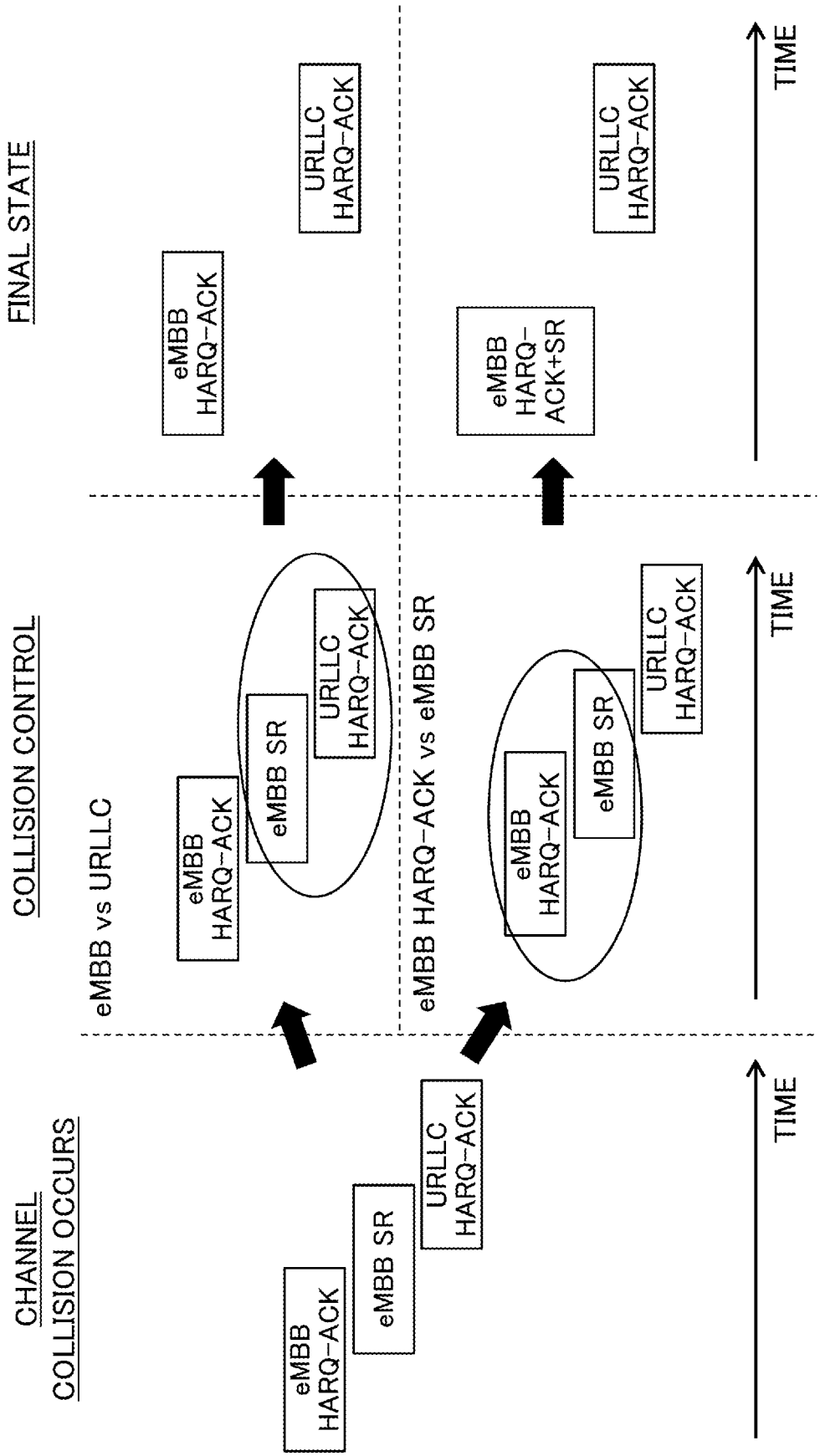

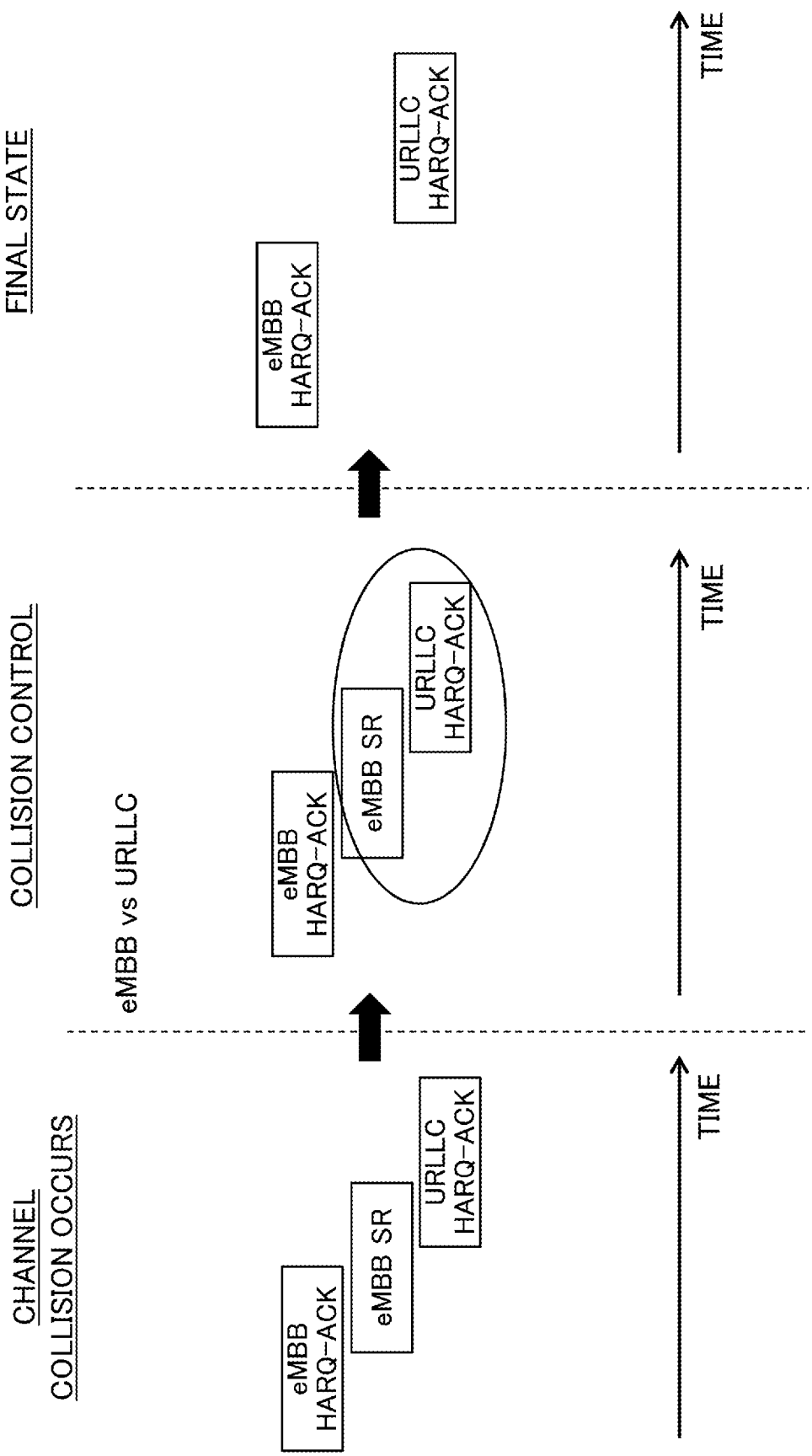

USER APPARATUS

TECHNICAL FIELD

The present invention relates to a user apparatus in a wireless communication system.

BACKGROUND ART

For NR (New Radio) (also referred to as "5G") that is a successor system to LTE (Long Term Evolution), techniques that meet requirements such as large capacity systems, high data transmission rates, low delay, simultaneous connection of multiple terminals, low costs, and power saving have been discussed (e.g., Non-Patent document 1).

5G communications are assumed to be applied to a new application such as autonomous driving or robot control. In this regard, URLLC (Ultra Reliable and Low Latency Communications), i.e., the technique for high reliability and low latency communications has been discussed (e.g., Non-Patent document 2). For example, an example of the requirement for the URLLC includes achieving reliability of 99.999% (packet arrival rate, or the like) in 32-byte packet transmission with a user plane delay of 1 ms or less. As described above, in 5G, requirements different from high speed and large capacity, such as eMBB (enhanced Mobile Broadband), are required to be flexibly met.

CITATION LIST

Non-Patent document 1: 3GPP TS 38.300 V15.5.0 (2019-03)
Non-Patent document 2: 3GPP TS 38.824 V16.0.0 (2019-03)

SUMMARY

Technical Problem

In NR wireless communication systems, communications, to which different requirements such as eMBB and URLLC are applied, coexist. Further, multiple communications, to which the same requirements are applied, may also coexist simultaneously. Thus, for example, when communication channels, to which different requirements are applied, collide with each other, and communication channels, to which the same requirements are applied, collide with each other, it is necessary to consider what order of processes for the collision should be applied to perform transmission.

In view of the point described above, an object of the present invention is to perform communication control when channels collide with each other in a wireless communication system.

Solution to Problem

According to disclosed techniques, a user apparatus is provided, including, a control unit configured to apply in a specific order a plurality of processing rules for determining a channel as a transmission candidate by dropping a channel or multiplexing channels and repeat the application until detecting no channel collision in a time domain, in a case where a channel associated with a first service type and a channel associated with a second service type collide with each other at least in a time domain, and, for at least one of the channel associated with the first service type and the channel associated with the second service type, a plurality of channels associated with a same service type collide with each other at least in the time domain; and a transmitting unit configured to transmit, to a base station apparatus, the channel as the transmission candidate for which no channel collision is detected in the time domain.

Advantageous Effects of Invention

According to the disclosed techniques, in a wireless communication system, a communication control when channels collide with each other can be performed.

BRIEF DESCRIPTION OF DRAWINGS

FIG. 1 is a diagram illustrating a wireless communication system according to an embodiment of the present invention;

FIG. 2 is a diagram illustrating an operation example (1) according to an embodiment of the present invention;

FIG. 3 is a table illustrating an operation example (1) according to an embodiment of the present invention;

FIG. 4 is a diagram illustrating an operation example (2) according to an embodiment of the present invention;

FIG. 5 is a diagram illustrating an operation example (3) according to an embodiment of the present invention;

DESCRIPTION OF EMBODIMENTS

Figure 6:
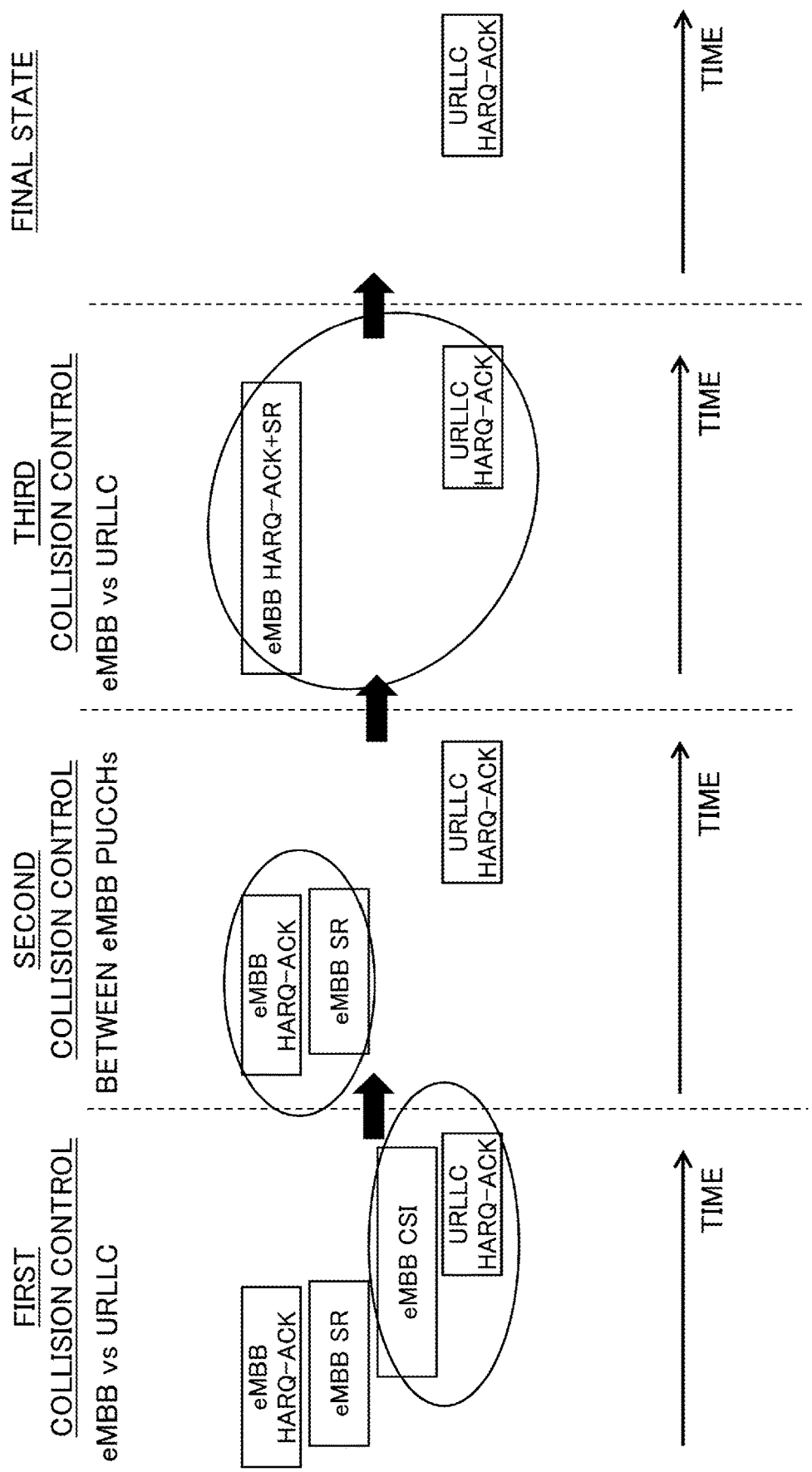
FIG. 6 is a diagram illustrating an operation example (4) according to an embodiment of the present invention.

An embodiment of the present invention will be hereinafter described with reference to the drawings. Note that the embodiment described below is merely an example, and the embodiment for which the present invention applies is not limited to the embodiment below.

In operating a wireless communication system according to an embodiment of the present invention, existing techniques are used as appropriate. The existing techniques include, for example, existing LTE, but are not limited to the existing LTE. The term "LTE" used in the specification broadly means LTE-Advanced and systems (e.g., NR) used after LTE-Advanced, unless otherwise stated.

In an embodiment of the present invention described below, terms used in an existing LTE, such as SS (Synchronization Signal); PSS (Primary SS); SSS (Secondary SS); PBCH (Physical broadcast channel); a PRACH (Physical random access channel); a PUCCH (Physical uplink control channel); and a PUSCH (Physical uplink shared channel), are used. This is for ease of description, and signals, functions, or the like that are similar to these terms may be referred to by other names. The above terms in NR respectively correspond to NR-SS, NR-PSS, NR-SSS, NR-PBCH, NR-PRACH, NR-PUCCH, NR-PUSCH, and the like. However, the signals used in NR are not necessarily expressed by "NR-".

In an embodiment of the present invention, a duplex system may include a TDD (Time Division Duplex) system, an FDD (Frequency Division Duplex) system, or other systems (e.g., Flexible Duplex, etc.).

In an embodiment of the present invention, "configure" used for a wireless parameter or the like may mean "pre-configure" used for a predetermined value, or mean that a wireless parameter indicated by a base station apparatus 10 or a user apparatus 20 is set.

FIG. 1 is a diagram illustrating a wireless communication system according to an embodiment of the present invention. The wireless communication system according to an embodiment of the present invention includes a base station apparatus 10 and a user apparatus 20, as illustrated in FIG. 1. In FIG. 1, one base station apparatus 10 and one user apparatus 20 are each illustrated. However, this is an example and each apparatus may be plural.

The base station apparatus 10 provides one or more cells and is a communication apparatus that wirelessly communicates with the user apparatus 20. A physical resource for a radio signal is defined in a time domain and a frequency domain, where the time domain may be defined by the number of OFDM symbols; and the frequency domain may be defined by the number of sub-carriers or the number of resource blocks. The base station apparatus 10 transmits synchronization signals and system information, to the user apparatus 20. The synchronization signals include, for example, NR-PSS and NR-SSS. The system information is transmitted, for example, by NR-PBCH and is also referred to as broadcasting information. As illustrated in FIG. 1, the base station apparatus 10 transmits a control signal or data with DL (Downlink), to the user apparatus 20, and receives a control signal or data with UL (Uplink), from the user apparatus 20. Each of the base station apparatus 10 and the user apparatus 20 can perform beam forming to transmit and receive signals. Also, each of the base station apparatus 10 and the user apparatus 20 can apply MIMO (Multiple Input Multiple Output) communication to the DL or the UL. Also, each of the base station apparatus 10 and the user apparatus 20 may communicate via a SCell (Secondary Cell) and a PCell (Primary Cell), through CA (Carrier Aggregation).

The user apparatus 20 is a communicating device having a wireless communication function, such as a smartphone, a mobile phone, a tablet, a wearable terminal, or a communication module for M2M (Machine-to-Machine). As illustrated in FIG. 1, the user apparatus 20 receives control signals or data with DL, from the base station apparatus 10 and transmits control signals or data with UL, to the base station apparatus 10, to thereby utilize various communication services provided by the wireless communication system.

In 5G, technologies with different requirements are used simultaneously, as in the case with eMBB (enhanced Mobile Broadband) enabling high speed and large capacity; and URLLC (Ultra Reliable and Low Latency Communications) enabling high reliability and low delay communication. In other words, QoSs (Quality of Services) that defer in a throughput, a delay time, a packet loss rate, or the like are assumed to be provided.

In the release 16 URLLC (also referred to as NR Rel. 16), a control in a collision between: an eMBB PUCCH or PUCCH; and a URLLC PUCCH or PUSCH has been discussed. In other words, the control in the collision between channels associated with different service types has been discussed. For example, a channel having a lower priority of the colliding channels may be dropped, or one of the colliding channels may be punctured.

Here, for the "priority", priority for a service type such as eMBB or URLLC may be defined. For example, URLLC priority may be higher than eMBB priority. As another "priority", priority for UCI (Uplink Control Information) type may be defined. For example, the UCI types may include HARQ-ACK (Hybrid automatic repeat request acknowledgment); SR (Scheduling Request); SP-CSI (Semi-persistent Channel State Information); and P-CSI (Periodic Channel State Information), and HARQ-ACK priority>SP priority>SP-CSI priority>P-CSI priority may be set.

FIG. 2 is a diagram illustrating an operation example (1) according to the embodiment of the present invention. A channel collision may be detected when multiple channels overlap at least in a time domain. A collision control may be performed when the channel collision is detected, as illustrated in FIG. 2. In the collision control illustrated in FIG. 2, a rule illustrated in FIG. 3 is applied to "eMBB HARQ-ACK", "eMBB SR", and "URLLC HARQ-ACK". For example, the collision control for "eMBB HARQ-ACK" versus "eMBB SR", as illustrated in FIG. 3, may be first performed, or the collision control for "eMBB SR" versus the "URLLC HARQ-ACK", as illustrated in FIG. 3, may be first performed. Note that A-SRS (Aperiodic Sounding Reference Signal) is also considered in the collision control of the channels.

FIG. 3 is a table illustrating an operation example (1) according to an embodiment of the present invention. FIG. 3 illustrates UCI that is transmitted when multiple UCI types collide with each other, and that is defined in the 3GPP Rel. 15 (also referred to as NR Rel. 15). Note that a process for such a collision may be applied to a collision between channels associated with the same service type. "PF" illustrated in FIG. 3 indicates a PUCCH format. When "CSI" or "PUCCH" collides with the "HARQ-ACK", the "SR", or the "CSI", the UCI as illustrated in FIG. 3 is transmitted. In FIG. 3, (*) indicates that a PUCCH resource set is determined by a UCI payload size, and that a PUCCH resource is determined by a PUCCH resource indicator field included in the last DCI (Downlink Control Information), which is the same as a PUCCH-resource determining method for HARQ-ACK after an RRC connection. In FIG. 3, (**) indicates that, when K number of SRs collide with each other, ceil ($\log_2$ (K+1)) bits are transmitted, and that transmission of one positive SR is allowed.

For example, when the "HARQ-ACK" and the "SR" collide with each other, in a case where PF for the "HARQ-ACK" is PF0, PF2, PF3 and PF4, the HARQ-ACK and the SR are transmitted. In a case where PF for the "HARQ-ACK" is PF1, or where PF for the "SR" is PF0, the SR is dropped and HARQ-ACK is transmitted using PF1 for the HARQ-ACK. In a case where PF for the "SR" is PF1 and where the SR is negative SR, the HARQ-ACK is transmitted using PF1 for the HARQ-ACK. In a case where PF for the "SR" is PF1 and where the SR is positive SR, the HARQ-ACK is transmitted using PF1 for the SR.

For example, when the "HARQ-ACK" and the "CSI" collide with each other, in a case where the upper layer parameter "simultaneousHARQ-ACK-CSI" is valid, the HARQ-ACK and the CSI are transmitted. In a case where the upper layer parameter "simultaneousHARQ-ACK-CSI" is not valid, the CSI is dropped.

For example, when the "SR" and the "SR" collide with each other, one positive SR is transmitted in accordance with UE implementation. For example, when the "SR" and the "CSI" collide with each other, the CSI and the SR are transmitted on a PUCCH resource for CSI.

For example, when the "CSI" and the "CSI" collide with each other, in a case where the upper layer parameter "multi-CSI-PUCCH-ResourceList" is set, multiple CSIs are transmitted on a PUCCH resource. However, when an encoding ratio exceeds a maximum value, some CSIs are dropped according to a priority order. When the upper layer parameter "multi-CSI-PUCCH-ResourceList" is not set, CSIs except for highest priority CSI are dropped.

For example, when the "PUSCH" and the "HARQ-ACK" collide with each other, the HARQ-ACK is multiplexed and transmitted with the PUSCH. For example, when the "PUSCH" and the "SR" collide with each other, in a case where the "PUSCH" is "UL-SCH (Uplink Shared Channel)" or "UL-SCH+A-CSI (Aperiodic CSI)", the SR is dropped. In a case where the "PUSCH" is "A/SP-CSI", the PUSCH is dropped. For example, when the "PUSCH" and the "CSI" collide with each other, the CSI is dropped. When the dropped CSI is P/SP-CSI, it may be transmitted over the PUCCH.

Hereafter, in applying the collision control, a control when channels associated with a different service type collide with each other, and/or, a control when channels associated with the same service type collide with each other, (for example, performing multiplexing or dropping, etc. of channels illustrated in FIG. 3), may be applied.

FIG. 4 is a diagram illustrating an operation example (2) according to the embodiment of the present invention. In FIG. 4, when "eMBB HARQ-ACK", "eMBB SR," and "URLLC HARQ-ACK" collide with each other, illustrated are operations in which: a collision control that is first applied is a control when the above channels associated with different service types collide with each other (hereinafter, referred to as "eMBB vs. URLLC"); and a collision control that is first applied is a control when the above channels associated with the same service type collide with each other (hereinafter, referred to as "eMBB vs. eMBB" and/or "URLLC vs. URLLC"). The "eMBB HARQ-ACK" refers to HARQ-ACK for UCI associated with eMBB, the "eMBB SR" is SR for UCI associated with eMBB, and "URLLC HARQ-ACK" refers to HARQ-ACK for UCI associated with URLLC.

As illustrated in FIG. 4, when the collision control that is first applied is given by "eMBB vs. URLLC", the URLLC is prioritized, and in a final state, "eMBB HARQ-ACK" and "URLLC HARQ-ACK" are transmitted. On the other hand, when the collision control that is first applied is given by "eMBB vs. eMBB," a process in which HARQ-ACK and SR are multiplexed is performed, and in a final state, "eMBB HARQ-ACK+SR" and "URLLC HARQ-ACK" are transmitted. As described above, when the three channels collide with each other, in the case where an order in which the collision control is applied differs, a given channel to be transmitted in the final state may differ.

FIG. 5 is a diagram illustrating an operation example (3) according to an embodiment of the present invention. A collision control when PUCCHs collide with each other will be described below. As a collision condition, a case in which an opportunity to transmit UCI (hereafter referred to as "URLLC-PUCCH") associated with URLLC, on a PUCCH resource occurs; in which an opportunity to transmit UCI (hereafter referred to as "eMBB-PUCCH") associated with eMBB, on another PUCCH resource occurs; and in which at least one PUCCH overlaps the URLLC-PUCCH and the eMBB-PUCCH, is assumed.

The collision control that is first applied is given by "eMBB vs. URLLC," and for example, "URLLC-PUCCH" may be prioritized. Next, the collision control given by "eMBB vs. eMBB" and/or "URLLC vs. URLLC" is applied, and UCI to be transmitted based on a given UCI type, as illustrated in FIG. 3, may be determined. Then, when the URLLC-PUCCH and eMBB-PUCCH further overlap, the collision control that is applied again is given by "eMBB vs. URLLC," and for example, "URLLC-PUCCH" is prioritized and the process may be repeated. Alternatively, an unintended error may be defined for the user apparatus 20.

As illustrated in FIG. 5 in which the above collision control is applied, when "eMBB SR" collides with "eMBB HARQ-ACK" and "URLLC HARQ-ACK", the collision control that is first applied is given by "eMBB vs. URLLC," and for example, the "URLLC HARQ-ACK" is prioritized and the "eMBB SR" is dropped. In a final state, the "eMBB HARQ-ACK" and the "URLLC HARQ-ACK" are transmitted.

FIG. 6 is a diagram illustrating an operation example (4) according to the embodiment of the present invention. As illustrated in FIG. 6, a case in which the collision control described in FIG. 5 is applied in a collision with respect to four channels is described.

When "eMBB CSI" collides with "eMBB HARQ-ACK," "eMBB SR," and "URLLC HARQ-ACK," the collision control that is first applied is given by "eMBB vs. URLLC," and for example, the "URLLC HARQ-ACK" is prioritized and "eMBB CSI" is dropped (first collision control). Next, because the "eMBB HARQ-ACK" and the "eMBB SR" collide with each other, the collision control given by "eMBB vs. eMBB" is applied, and "eMBB HARQ-ACK+SR" is configured as a transmission candidate (second collision control). Next, because the "eMBB HARQ-ACK+SR" and the "URLLC HARQ-ACK" collide with each other, the collision control that is applied again is given by "eMBB vs. URLLC", and the "eMBB vs. eMBB" and the "URLLC HARQ-ACK" are prioritized and the "eMBB HARQ-ACK+SR" is dropped (third collision control). In a final state, the "URLLC HARQ-ACK" is transmitted.

Figure 7:
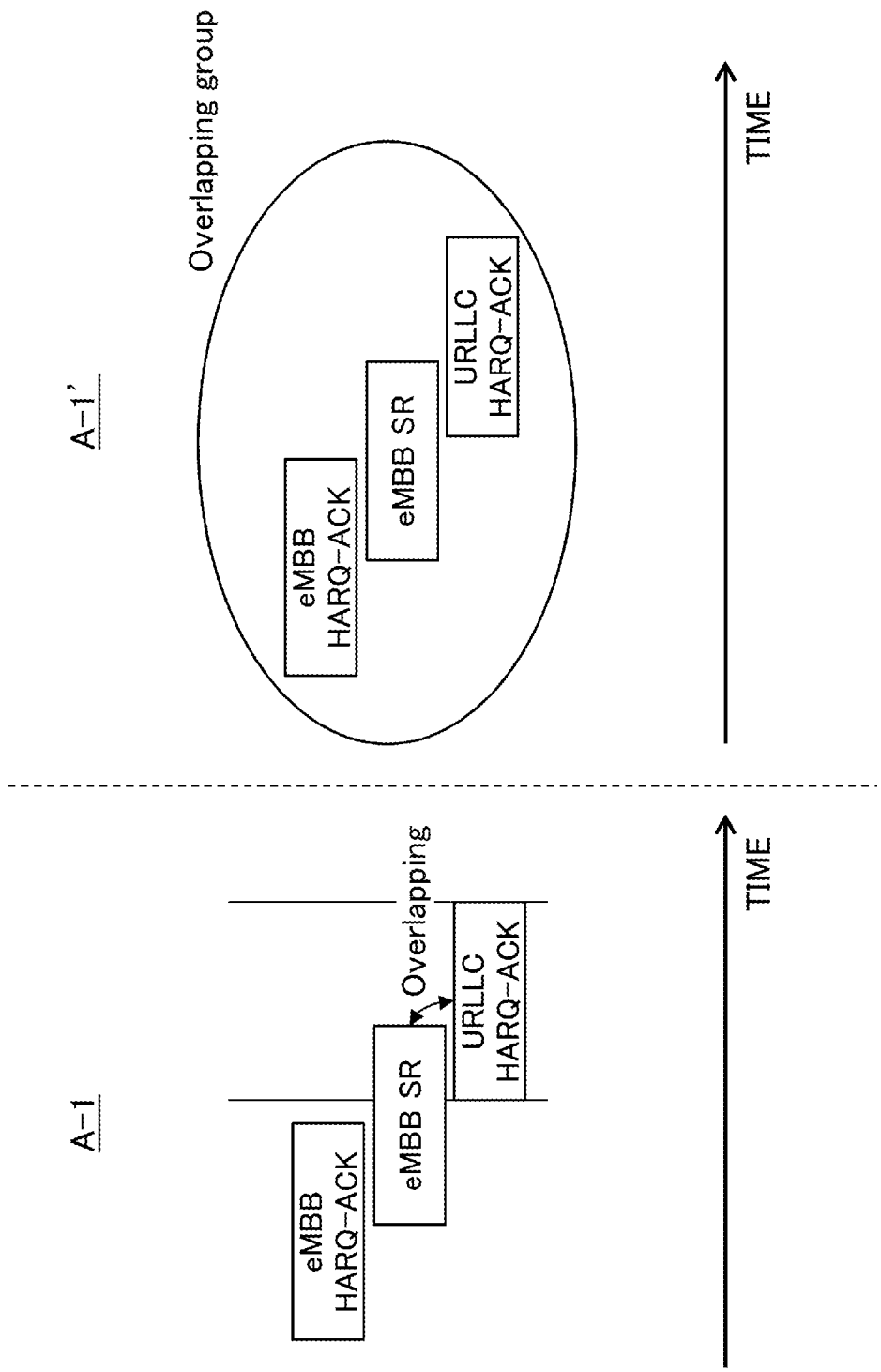
FIG. 7 is a diagram illustrating an operation example (5) according to an embodiment of the present invention.

FIG. 7 is a diagram illustrating an operation example (5) according to the embodiment of the present invention. With reference to FIG. 7, coverage of channels to which collision control is applied will be described. As given in A-1 illustrated in FIG. 7, the collision control given by "eMBB vs. URLLC" may apply to a PUCCH colliding with URLLC-PUCCH. Also, as given in A-1' illustrated in FIG. 7, one PUCCH and overlapping multiple PUCCHs are defined as an overlapping group (which is assumed to include at least one URLLC-PUCCH), and the collision control given by "eMBB vs. URLLC" may apply to the group. The collision control described in FIGS. 5, 6, and 8 to 13 may apply to a group such as the overlapping group in A-1' illustrated in FIG. 7.

For example, when the collision control "eMBB vs. URLLC" is applied in A-1 illustrated in FIG. 7, "eMBB SR" is dropped, "URLLC HARQ-ACK" is prioritized, and "eMBB HARQ-ACK" and the "URLLC HARQ-ACK" are transmitted. On the other hand, when the collision control "eMBB vs. URLLC" is applied in A-1' illustrated in FIG. 7, "eMBB HARQ-ACK" and "eMBB SR" are dropped and "URLLC HARQ-ACK" is transmitted.

Figure 8:
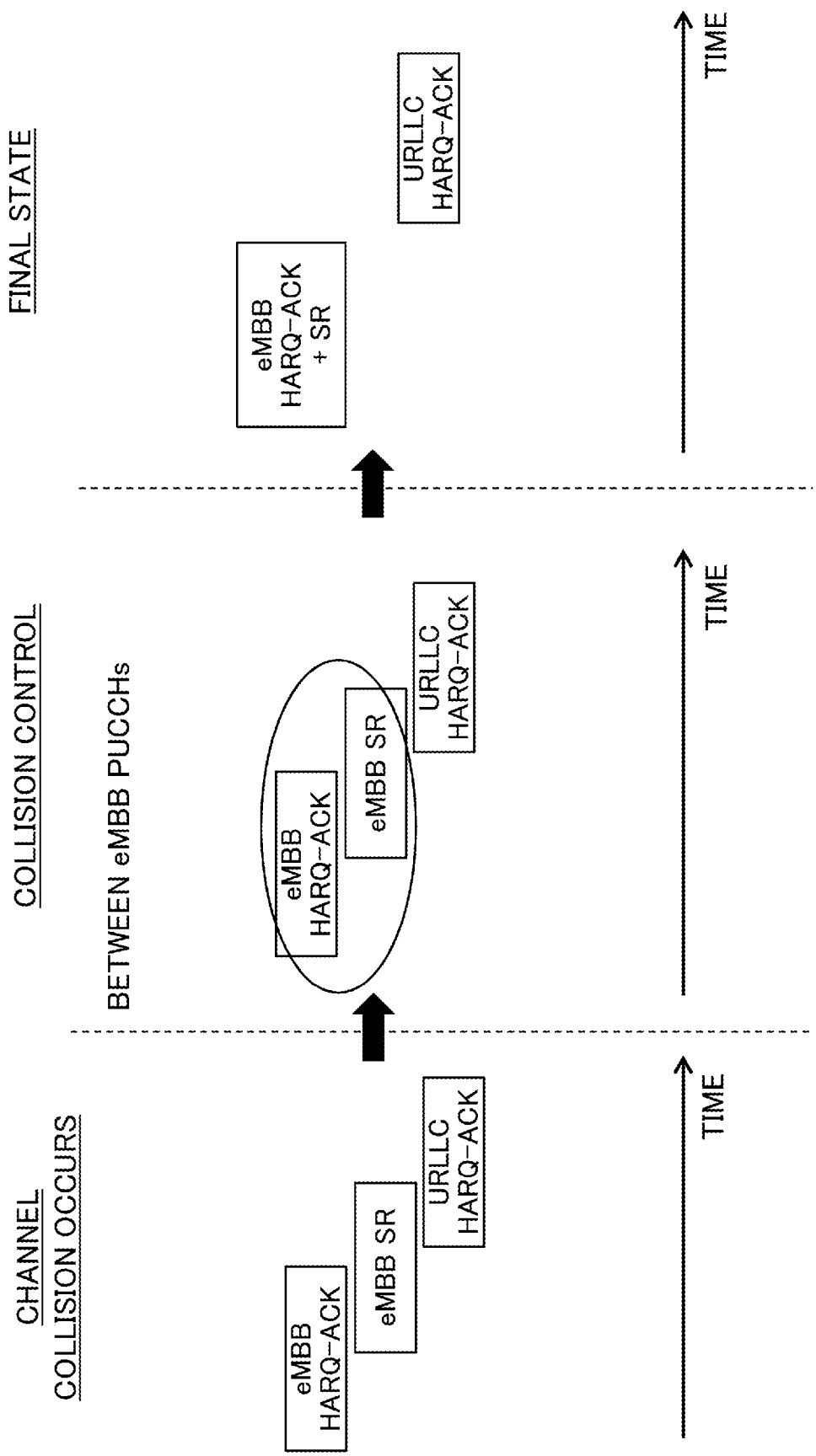
FIG. 8 is a diagram illustrating an operation example (6) according to an embodiment of the present invention.

FIG. 8 is a diagram illustrating an operation example (6) according to the embodiment of the present invention. When a collision is detected, the collision control that is first applied is set as the collision control given by "eMBB vs. eMBB" and/or "URLLC vs. URLLC," and UCI to be transmitted based on a given UCI type, as illustrated in FIG. 3, may be determined. The collision control that is applied next is given by "eMBB-PUCCH" versus "URLLC-PUCCH," and for example, the "URLLC-PUCCH" may be prioritized. Then, when an overlap between eMBB-PUCCHs; or between URLLC-PUCCHs further occurs, the collision control that is applied again is set as the collision control given by "eMBB vs. eMBB" and/or "URLLC vs. URLLC", and UCI to be transmitted based on a given UCI type, as illustrated in FIG. 4, is determined and the process may be repeated. Alternatively, an unintended error may be defined for the user apparatus 20.

As illustrated in FIG. 8 in which the above collision control is applied, when "eMBB SR" collides with "eMBB HARQ-ACK" and "URLLC HARQ-ACK", the priority that is first applied is to apply the collision control given by "eMBB vs. eMBB", and the collision control between eMBB-PUCCHs is applied, and "eMBB HARQ-ACK+SR" is set as a transmission candidate. In a final state, the "eMBB HARQ-ACK+SR" and the "URLLC HARQ-ACK" are transmitted.

Here, the URLLC-PUCCH may be a PUCCH including UCI associated with URLLC. For example, the URLLC-PUCCH may be indicated by RNTI (Radio Network Temporary Identifier) used to scramble CRC with DCI for triggering UCI transmission; a DCI format; a DCI field; or an upper layer parameter. The eMBB-PUCCH may be a PUCCH including UCI associated with eMBB. For example, the eMBB-PUCCH may be specified by RNTI used to scramble CRC with DCI for triggering UCI transmission; a DCI format; a DCI field; or an upper layer parameter.

For example, the collision control that is first applied may be changed based on a UCI type. For example, the first applied collision control "eMBB vs. URLLC" described in FIGS. 5 and 6 is directed to a collision with the PUCCH including at least one of HARQ-ACK and SR, and the first applied collision control "eMBB vs. eMBB" and/or "URLLC vs. URLLC", as described in FIG. 8, may be directed to a collision with the PUCCH including CSI only.

Further, a timeline requirement may be applied to a requirement for URLLC-PUCCH. In other words, for a minimum time required between a last symbol of at least one PDSCH assigned by a PDCCH for scheduling a PUCCH to which the collision control applies and an earliest symbol of a PUCCH to which the collision is applied, a value set for URLLC-PUCCH may be used to determine whether the collision control applies or not. For example, when eMBB-PUCCH and URLLC-PUCCH overlap and a collision control is performed, the PUCCH may be required to meet a timeline requirement set for URLLC-PUCCH. The timeline requirement includes a channel allocation condition taking into account a processing time at the user apparatus 20.

Note that as a definition of the "overlap or collision channel", a channel overlapping in at least a time domain may be used, or a channel overlapping in a time domain, frequency domain, code domain may be used. The collision may be referred to as an overlap, be referred to as a collision, or be referred to by other terms.

Figure 9:
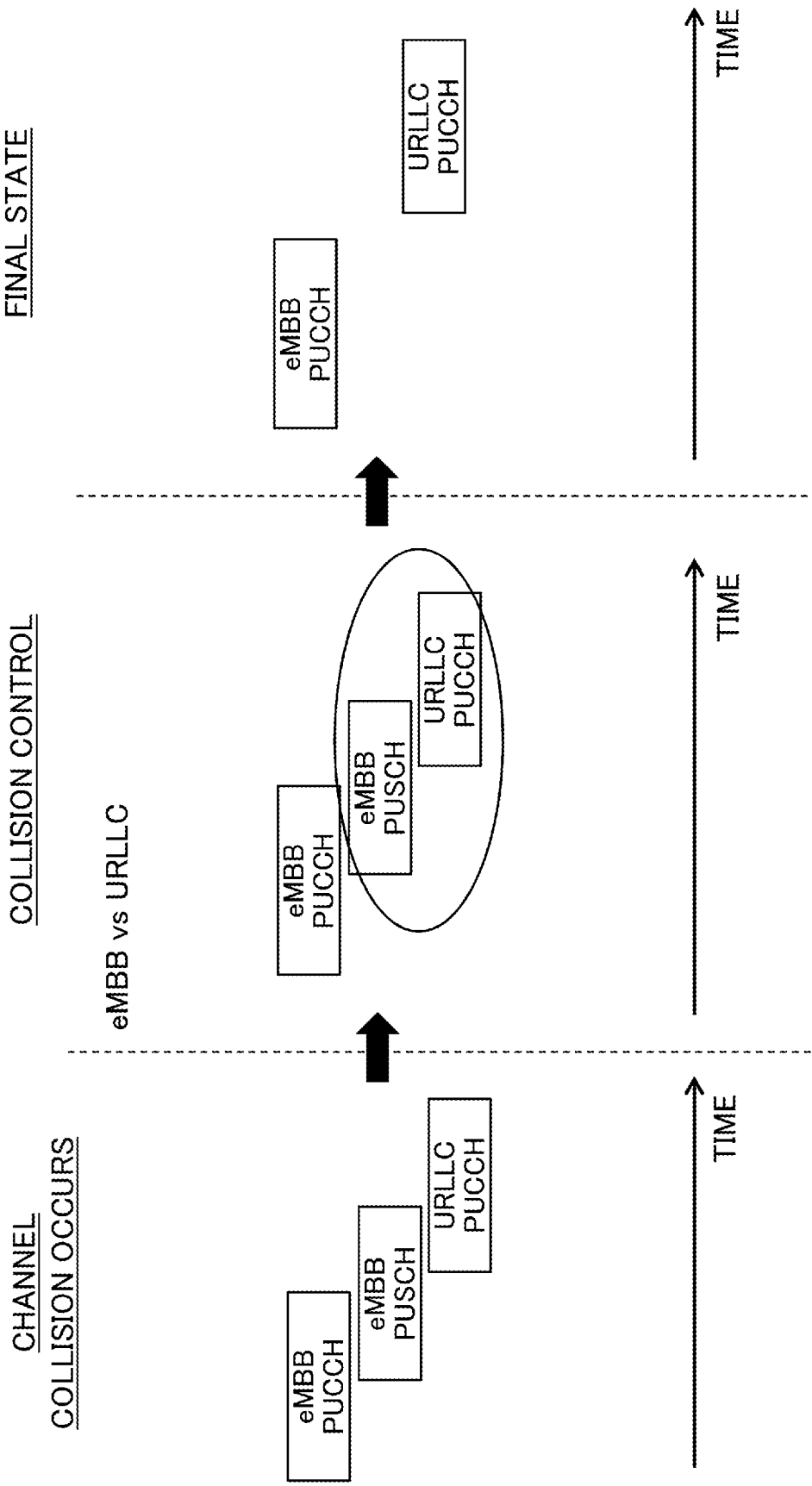
FIG. 9 is a diagram illustrating an operation example (7) according to an embodiment of the present invention.

FIG. 9 is a diagram illustrating an operation example (7) according to the embodiment of the present invention. The collision control when the PUCCH and the PUSCH collide with each other will be described below. As a collision condition, a case in which URLLC-PUCCH collides with eMBB-PUCCH, a PUSCH (hereafter referred to as "URLLC-PUSCH") associated with URLLC, or a PUSCH (hereafter referred to as "eMBB-PUSCH") associated with eMBB, and in which at least one PUCCH overlaps the URLLC-PUSCH and the eMBB-PUSCH; or at least one PUSCH overlaps the URLLC-PUCCH and the eMBB-PUCCH, is assumed.

The collision control that is first applied is given by "eMBB vs. URLLC," and "URLLC-PUCCH" or "URLLC-PUSCH" may be prioritized. Next, the collision control given by "eMBB vs. eMBB" and/or "URLLC vs. URLLC" is applied and the process illustrated in FIG. 3 may be performed. Then, if the URLLC-PUCCH and the eMBB-PUCCH still overlap, the collision control that is applied again is given by "eMBB vs. URLLC", and for example, "URLLC-PUCCH" or "URLLC-PUSCH" is prioritized and the process may be repeated. Alternatively, an unintended error may be defined for the user apparatus 20.

As illustrated in FIG. 9 in which the above collision control is applied, when the "eMBB PUSCH" collides with the "eMBB PUCCH" and the "URLLC PUCCH", the collision control that is first applied is given by "eMBB vs. URLLC", and for example, the "URLLC PUCCH" is prioritized and the "eMBB PUSCH" is dropped. In a final state, the "eMBB PUCCH" and the "URLLC PUCCH" are transmitted.

Figure 10:
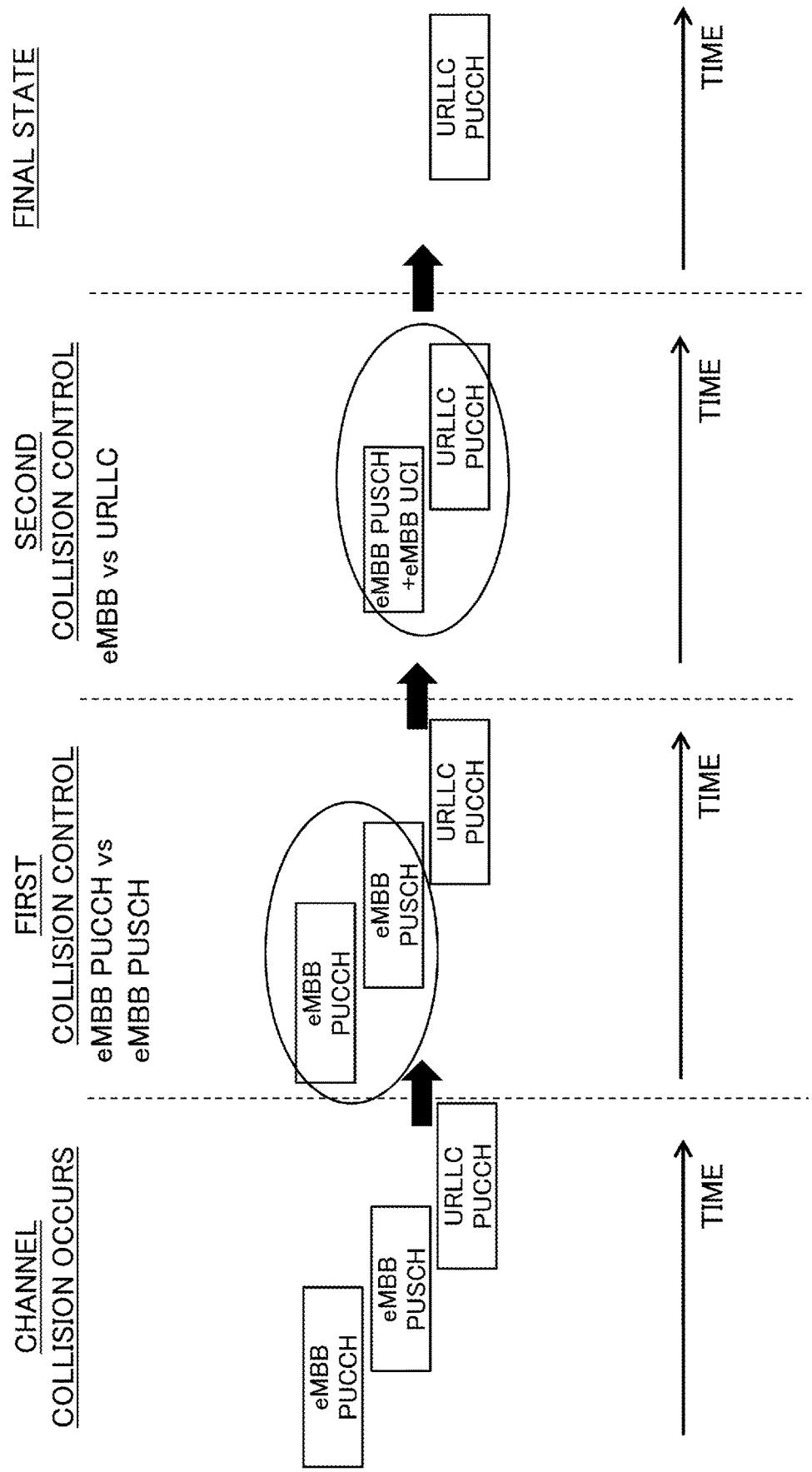
FIG. 10 is a diagram illustrating an operation example (8) according to an embodiment of the present invention.

FIG. 10 is a diagram illustrating an operation example (8) according to the embodiment of the present invention. The collision control that is first applied is set as the collision control given by "eMBB vs. eMBB" and/or "URLLC vs. URLLC," and the process illustrated in FIG. 3 may be performed. Next, the collision control given by "eMBB vs. URLLC" is applied and "URLLC-PUCCH" or "URLLC-PUSCH" may be prioritized. Then, if an overlap still occurs between eMBB-PUCCH and eMBB-PUSCH; or between URLLC-PUCCH and URLLC-PUSCH, the collision control that is applied again is set as the collision control given by "eMBB vs. eMBB" and/or "URLLC vs. URLLC," and the process illustrated in FIG. 3 may be repeated. Alternatively, an unintended error may be defined for the user apparatus 20.

As illustrated in FIG. 10 in which the above collision control is applied, when "eMBB PUSCH" collides with "eMBB PUCCH" and "URLLC PUCCH", the collision control that is first applied is set as the collision control given by "eMBB vs. eMBB" and/or "URLLC vs. URLLC", and for example, UCI (eMBB UCI) on the "eMBB-PUCCH" is multiplexed on "eMBB-PUSCH" (first collision control). Next, the collision control given by "eMBB vs. URLLC" is applied, and "URLLC PUCCH" is prioritized, so that "eMBB PUSCH+eMBB UCI" is dropped (second collision control). In a final state, the "URLLC PUCCH" is transmitted.

Figure 11:
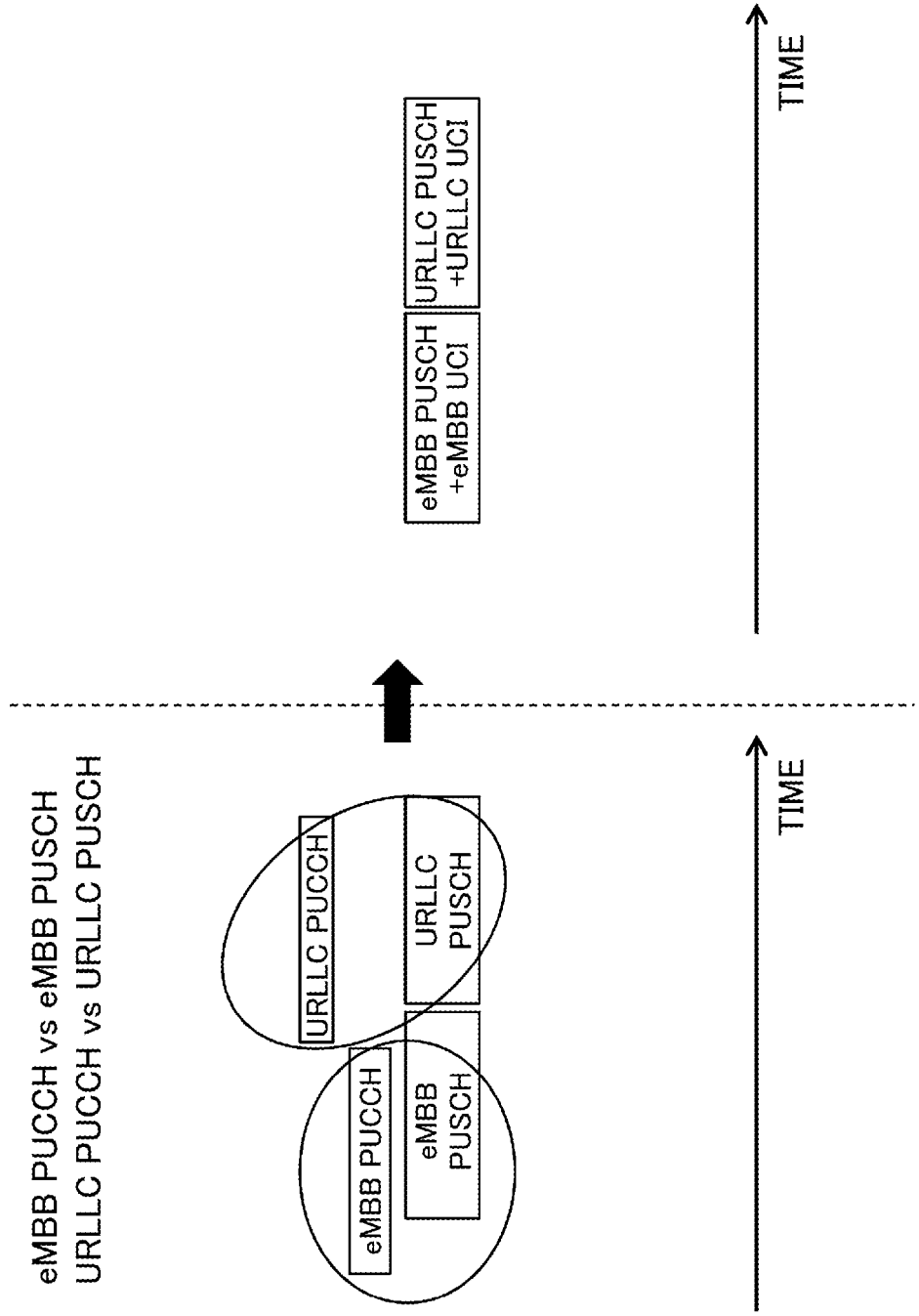
FIG. 11 is a diagram illustrating an operation example (9) according to an embodiment of the present invention.

FIG. 11 is a diagram illustrating an operation example (9) according to the embodiment of the present invention. The collision control that is applied may differ depending upon a collision channel. For example, the collision control that is first applied only in a case where URLLC-PUSCH overlaps eMBB-PUSCH may be given by "eMBB vs. URLLC," or, in other cases, the collision control that is first applied may be set as the collision control given by "eMBB vs. eMBB" and/or "URLLC vs. URLLC".

In FIG. 11, since URLLC-PUSCH does not overlap eMBB-PUSCH, the collision control that is first applied is set as the collision control given by "eMBB vs. eMBB" and/or "URLLC vs. URLLC". In a final state, UCI (eMBB UCI) on "eMBB-PUCCH" is multiplexed on "eMBB-PUSCH", and UCI (URLLC UCI) on "URLLC-PUCCH" is multiplexed on "URLLC-PUSCH", so that the "eMBB-PUSCH" and the "URLLC-PUSCH" are transmitted.

Figure 12:
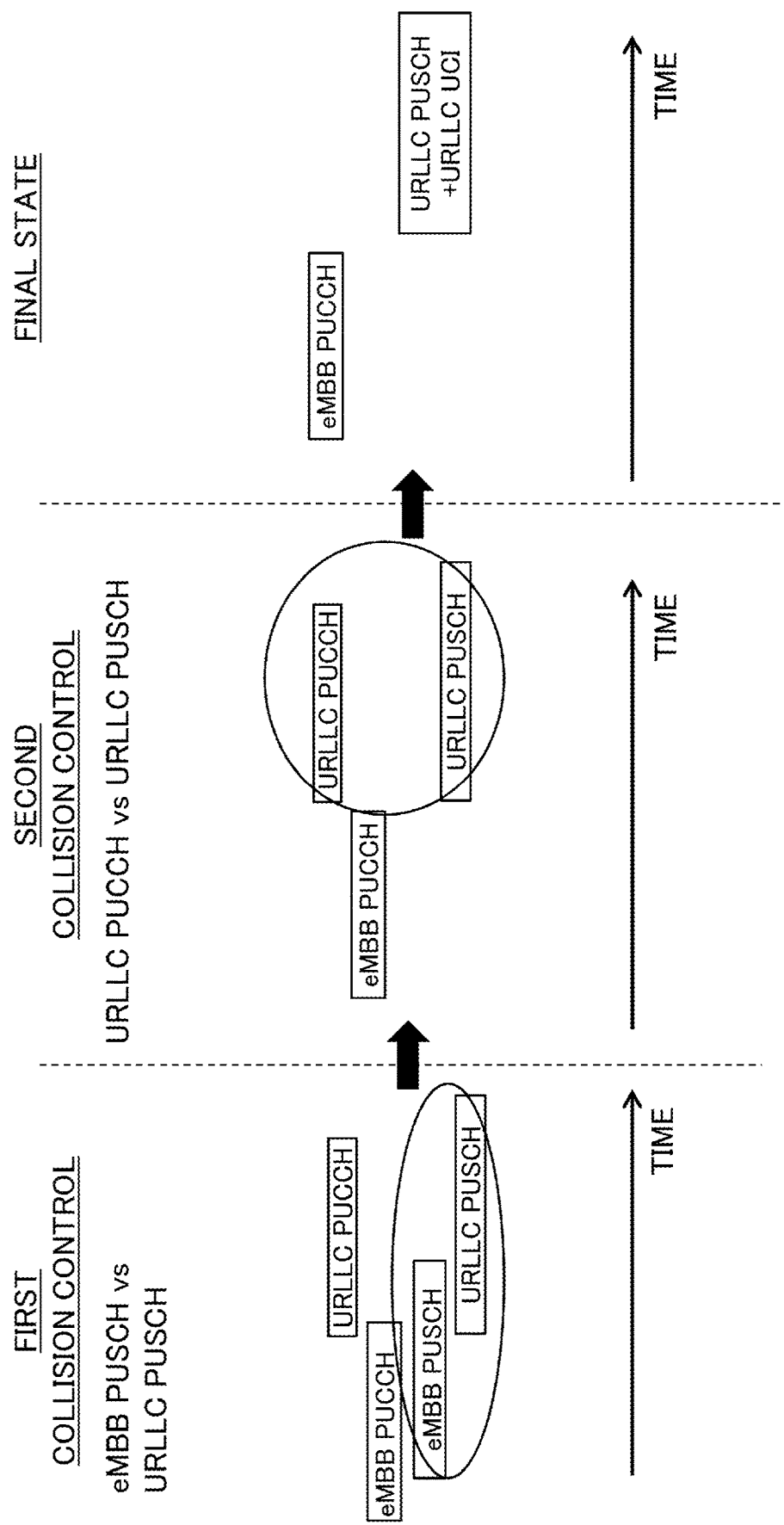
FIG. 12 is a diagram illustrating an operation example (10) according to an embodiment of the present invention.

FIG. 12 is a diagram illustrating an operation example (10) according to the embodiment of the present invention. In FIG. 12, since URLLC-PUSCH overlaps eMBB-PUSCH, the collision control that is first applied is given by "eMBB vs. URLLC." The "URLLC-PUSCH" is prioritized and the "eMBB-PUSCH" is dropped (first collision control).

Next, the collision control between URLLC-PUCCH and URLLC-PUSCH is applied, and UCI (URLLC UCI) on the URLLC-PUCCH is multiplexed on the URLLC-PUSCH, to be "URLLC-PUSCH+URLLC UCI". In a final state, "eMBB-PUCCH" and the "URLLC-PUSCH+URLLC UCI" are transmitted.

Note that when multiple PUCCHs and multiple PUSCHs overlap, the collision control described in FIG. 10 or FIG. 11 may be applied in any order. For example, the collision control may be applied in the following order.

1) eMBB-PUCCH versus URLLC-PUCCH
2) Between eMBB-PUCCHs, or between URLLC-PUCCHs
3) eMBB-PUCCH versus URLLC-PUSCH, or, URLLC-PUCCH versus eMBB-PUSCH
4) eMBB-PUCCH versus eMBB-PUSCH, or, URLLC-PUCCH versus URLLC-PUSCH For example, the collision control may be also applied in the following order.

1) eMBB-PUCCH versus URLLC-PUCCH
2) eMBB-PUCCH versus URLLC-PUSCH, or, URLLC-PUCCH versus eMBB-PUSCH
3) Between eMBB-PUCCHs, or between URLLC-PUCCHs
4) eMBB-PUCCH versus eMBB-PUSCH, or, URLLC-PUCCH versus URLLC-PUSCH Here, the URLLC-PUSCH may be a PUSCH including UL-SCH associated with URLLC. For example, the URLLC-PUSCH may be indicated by RNTI used to scramble CRC with DCI for triggering UL-SCH transmission; a DCI format; a DCI field; or an upper layer parameter as an MCS (Modulation and Coding Scheme) table. The eMBB-PUSCH may be a PUSCH including UL-SCH associated with eMBB. For example, the eMBB-PUCCH may be specified by RNTI used to scramble CRC with DCI for triggering UL-SCH transmission; a DCI format; a DCI field; or an upper layer parameter as an MCS table.

Figure 13:
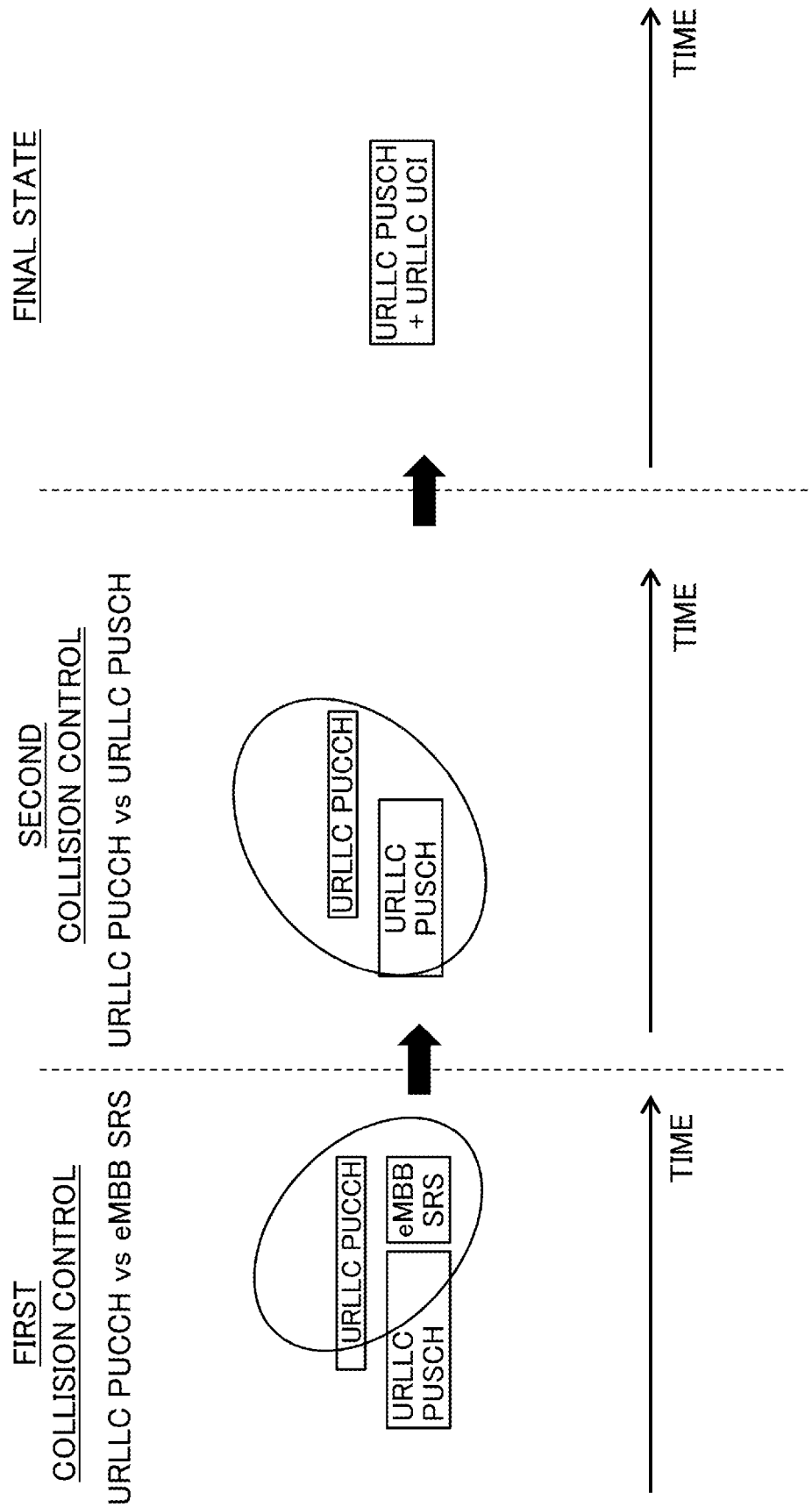
FIG. 13 is a diagram illustrating an operation example (11) according to an embodiment of the present invention.

FIG. 13 is a diagram illustrating an operation example (11) according to the embodiment of the present invention. When a PUCCH collides with A-SRS and another PUCCH or a PUSCH, the collision control may be applied below as a) to d).

a) When the A-SRS is associated with URLLC, the collision control for the PUCCH and the PUSCH, as described in FIGS. 5 to 12, is applied first. When the A-SRS is not associated with URLLC, the collision control for the A-SRS and the PUCCH is applied first.

b) When the A-SRS is associated with URLLC, the collision control for the A-SRS and the PUCCH is applied first. When the A-SRS is not associated with URLLC, the collision control for the PUCCH and the PUSCH, as described in FIGS. 5 to 12, is applied first.

c) When the PUCCH or PUSCH that collides with the A-SRS is associated with URLLC, the collision control for the PUCCH and the PUSCH, as described in FIGS. 5 to 12, is applied first. When the PUCCH or PUSCH that collides with the A-SRS is not associated with URLLC, the collision control for the A-SRS and the PUCCH is applied first.

d) When the PUCCH or PUSCH that collides with the A-SRS is associated with URLLC, the collision control for the A-SRS and the PUCCH is applied first. When the PUCCH or PUSCH that collides with the A-SRS is not associated with URLLC, the collision control for the PUCCH and the PUSCH, as described in FIGS. 5 to 12, is applied first.

FIG. 13 illustrates the process in which a) above is applied. Since the A-SRS is associated with eMBB, which is not URLLC, the collision control "URLLC vs. eMBB-SRS" is applied first. Next, the collision control "URLLC-PUCCH vs. URLLC-PUSCH" is applied, and in a final state, "URLLC-PUSCH+URLLC UCI" is transmitted.

Here, the URLLC-SRS is SRS associated with URLLC, and may be indicated by, for example, RNTI used to scramble CRC with DCI for triggering SRS transmission; a DCI format; a DCI field; or an upper layer parameter. The eMBB-SRS is SRS associated with eMBB, and may be indicated by, for example, RNTI used to scramble CRC with DCI for triggering SRS transmission; a DCI format; a DCI field; or an upper layer parameter.

Figure 14:
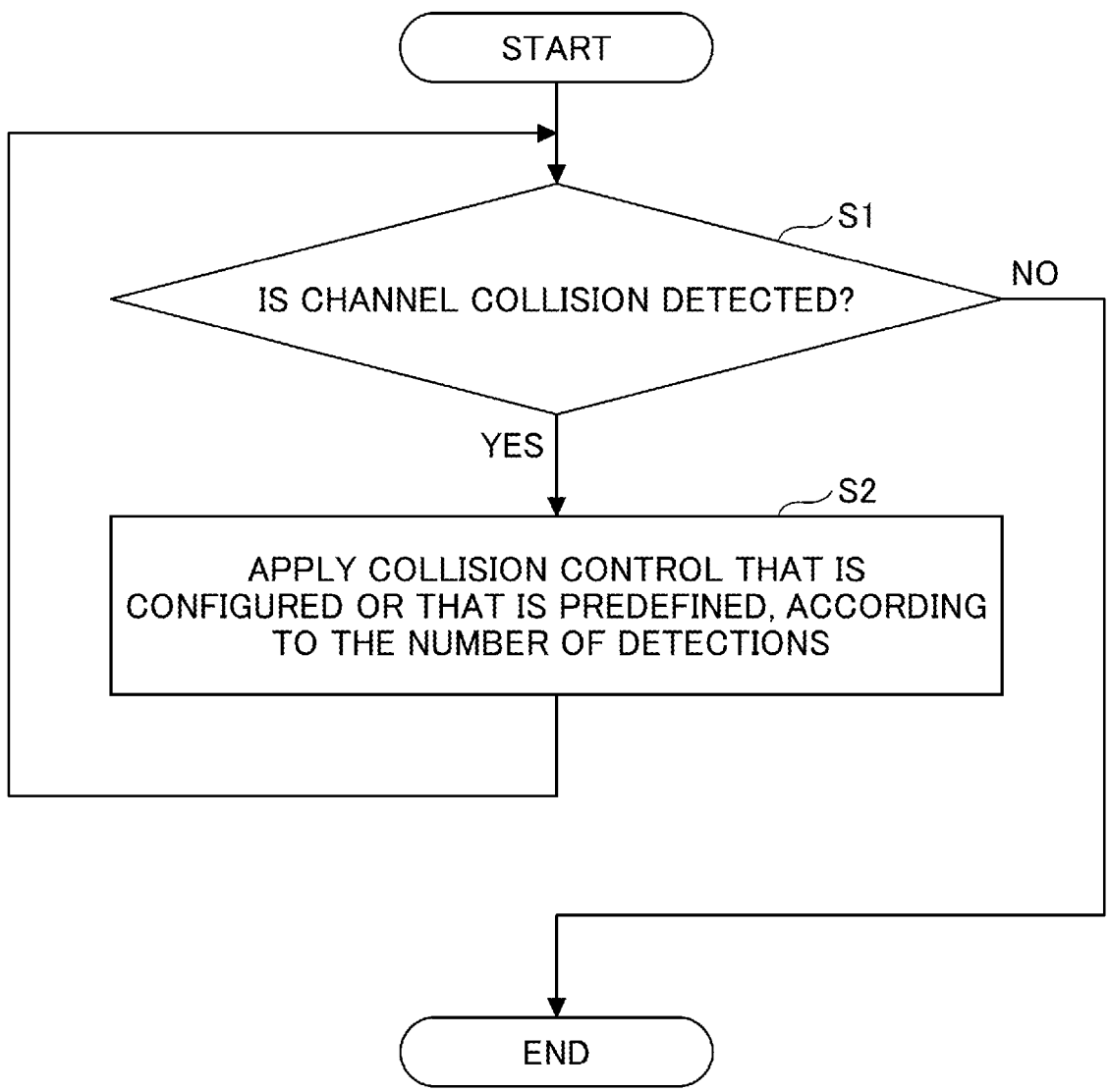
FIG. 14 is a flowchart illustrating the operation example according to an embodiment of the present invention.

FIG. 14 is a flowchart illustrating an example of the operation according to the embodiment of the present invention. In step S1, the user apparatus 20 determines whether a channel collision is detected or not. The channel collision may be detected in the time domain, or be detected in the frequency domain or code domain. When a channel collision is detected (YES in S1), the process proceeds to step S2. When a channel collision is not detected (NO in S1), the flow is terminated.

In step S2, the user apparatus 20 applies the collision control that is set by the base station apparatus 10 or that is preset, according to the number of detections, so as to apply the collision control described in FIGS. 5 to 13. After the collision control is applied and the channel is dropped or is multiplexed, the user apparatus 20 again takes step S1.

According to the embodiment described above, when the PUCCH associated with URLLC collides with other channel (s), the user apparatus 20 can apply the collision control that is set by the base station apparatus 10 or that is preset, to determine the channel to be transmitted.

In other words, in the wireless communication system, the communication control when the channels collide with each other can be performed.

(Apparatus Configuration)

Hereafter, an example of a functional configuration of the base station apparatus 10 and the user apparatus 20, which execute the processing and operation described above, is described. The base station apparatus 10 and the user apparatus 20 each include the functions for implementing the above embodiment. However, each of the base station apparatus 10 and the user apparatus 20 may include a portion of the functions described in the embodiment.

<Base Station Apparatus 10>

Figure 15:
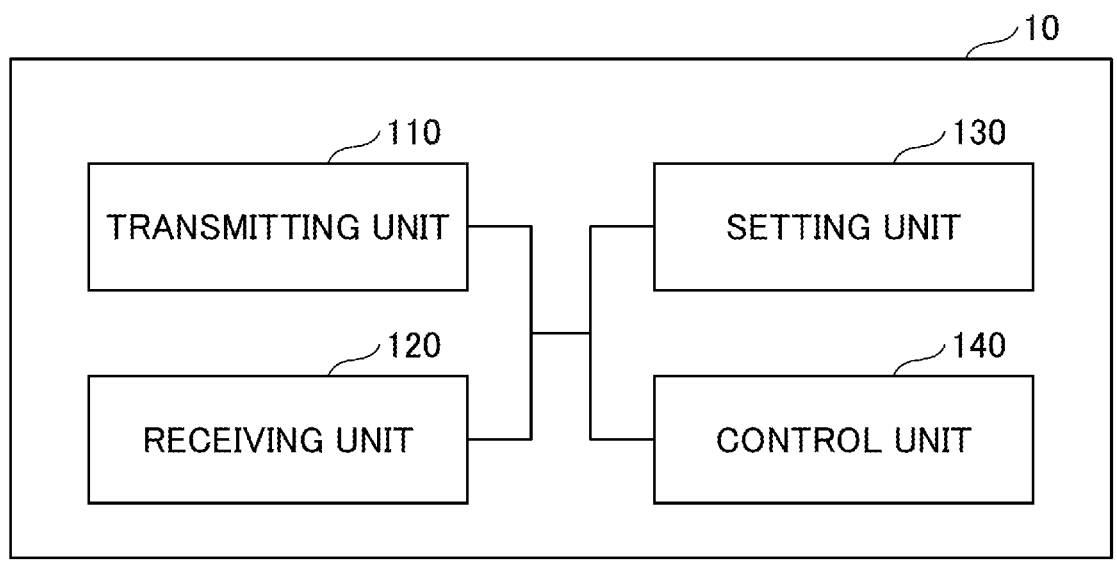
FIG. 15 is a diagram illustrating an example of a functional configuration of a base station apparatus 10 according to an embodiment of the present invention.

FIG. 15 is a diagram illustrating an example of a functional configuration of the base station apparatus 10.

As illustrated in FIG. 15, the base station apparatus 10 includes a transmitting unit 110, a receiving unit 120, a setting unit 130, and a control unit 140. The functional configuration illustrated in FIG. 15 is merely one example. Any name may be used for functional sections and functional units as long as the operation according to the embodiment of the present invention can be executed.

The transmitting unit 110 includes a function of generating signals to be transmitted to the user apparatus 20, to transmit the signals by wireless. The receiving unit 120 includes a function of receiving various types of signals transmitted from the user apparatus 20, to obtain information on, e.g., a higher layer, from the received signal. Also, the transmitting unit 110 includes a function of transmitting, to the user apparatus 20, NR-PSS, NR-SSS, NR-PBCH, DL/UL control signal, or the like.

The setting unit 130 stores preset setting information and various setting information to be transmitted to the user apparatus 20, in a storage device, and retrieves information from the storage device, as necessary. The contents of the setting information include, for example, a communication setting relating to the PUCCH and the PUSCH used for the user apparatus 20; and the like.

As described in the embodiment, the control unit 140 performs scheduling of the PUCCH and PUSCH for the user apparatus 20, via the transmitting unit 110. The transmitting unit 110 includes a functional unit relating to transmission of signals used in the control unit 140, and the receiving unit 120 may include a functional unit relating to reception of signals used in the control unit 140.

<User Apparatus 20>

Figure 16:
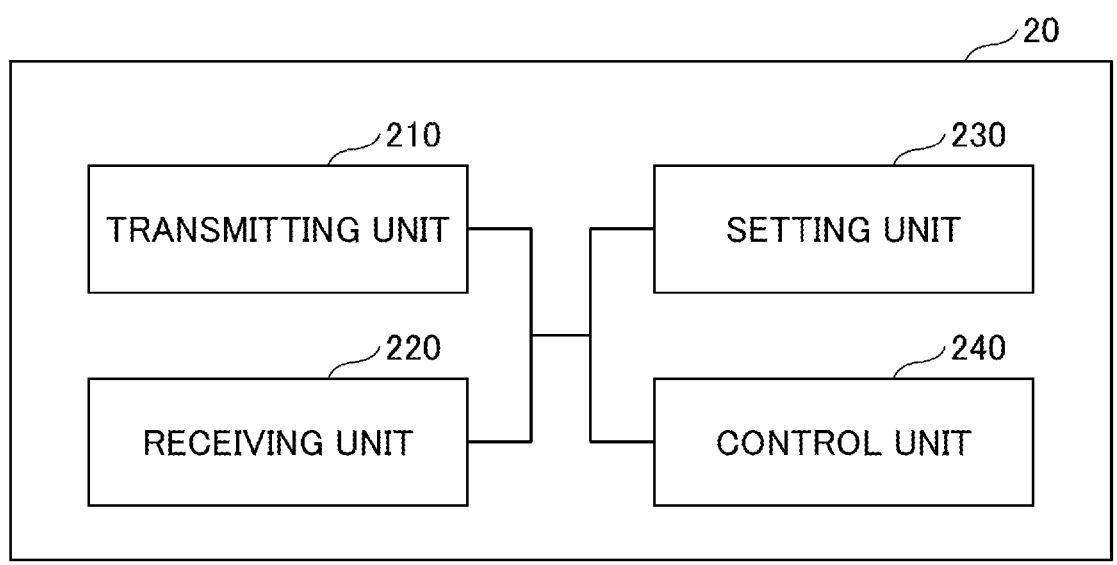
FIG. 16 is a diagram illustrating an example of a functional configuration of a user apparatus 20 according to an embodiment of the present invention.

FIG. 16 is a diagram illustrating an example of a functional configuration of the user apparatus 20. As illustrated in FIG. 16, the user apparatus 20 includes a transmitting unit 210, a receiving unit 220, a setting unit 230, and a control unit 240. The functional configuration illustrated in FIG. 16 is merely one example. Any name may be used for functional sections and functional units as long as the operation according to the embodiment of the present invention can be executed.

The transmitting unit 210 generates a transmission signal from transmission data, and transmits the transmission signal by wireless. The receiving unit 220 receives various signals by wireless, and obtains a signal of a higher layer, from a received signal of a physical layer. The receiving unit 220 has a function of receiving NR-PSS, NR-SSS, NR-PBCH, DL/UL/SL control signal, or the like, which is transmitted from the base station apparatus 10. For example, for D2D communication, the transmitting unit 210 transmits, to another user apparatus 20, PSCCH (Physical Sidelink Control Channel), PSSCH (Physical Sidelink Shared Channel), PSDCH (Physical Sidelink Discovery Channel), PSBCH (Physical Sidelink Broadcast Channel), and the like; and the receiving unit 120 receives, from another user apparatus 20, PSCCH, PSSCH, PSDCH, PSBCH, or the like.

The setting unit 230 stores, in a storage device, various setting information received from the base station apparatus 10 or the user apparatus 20, by using the receiving unit 220, and retrieves information from the storage device, as necessary. The setting unit 230 also stores preset setting information. The contents of the setting information include, for example, setting information relating to UCI; a communication setting relating to the PUCCH and PUSCH; and the like.

As described in the embodiment, the control unit 240 controls transmission of the PUCCH and PUSCH including UCI, to the base station apparatus 10, via the transmitting unit 210. The transmitting unit 210 includes a functional unit relating to transmission of signals used in the control unit 240, and the receiving unit 220 may include a functional unit relating to reception of signals used in the control unit 240.

(Hardware Configuration)

In the block diagrams (FIGS. 15 and 16) used for the description of the above embodiment, the functional blocks of the functional units are illustrated. The functional blocks (configuring units) are implemented by any combination of at least one of hardware and software. A method of implementing each functional block is not particularly limited. In other words, each functional block may be implemented by one device that is physically or logically coupled, or be implemented by using a plurality of devices being two or more devices that are physically or logically separated and that are directly or indirectly connected (for example, by wired, wireless, or the like). The function block may be realized by combining software with the one device or the plurality of devices.

The functions include determining, deciding, judging, computing, calculating, processing, deriving, investigating, searching, confirming, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, and the like, but are not limited thereto. For example, a functional block (configuring unit) that causes transmission to function is referred to as a transmitting unit or a transmitter. In any case, as described above, an implementation method is not particularly limited.

Figure 17:
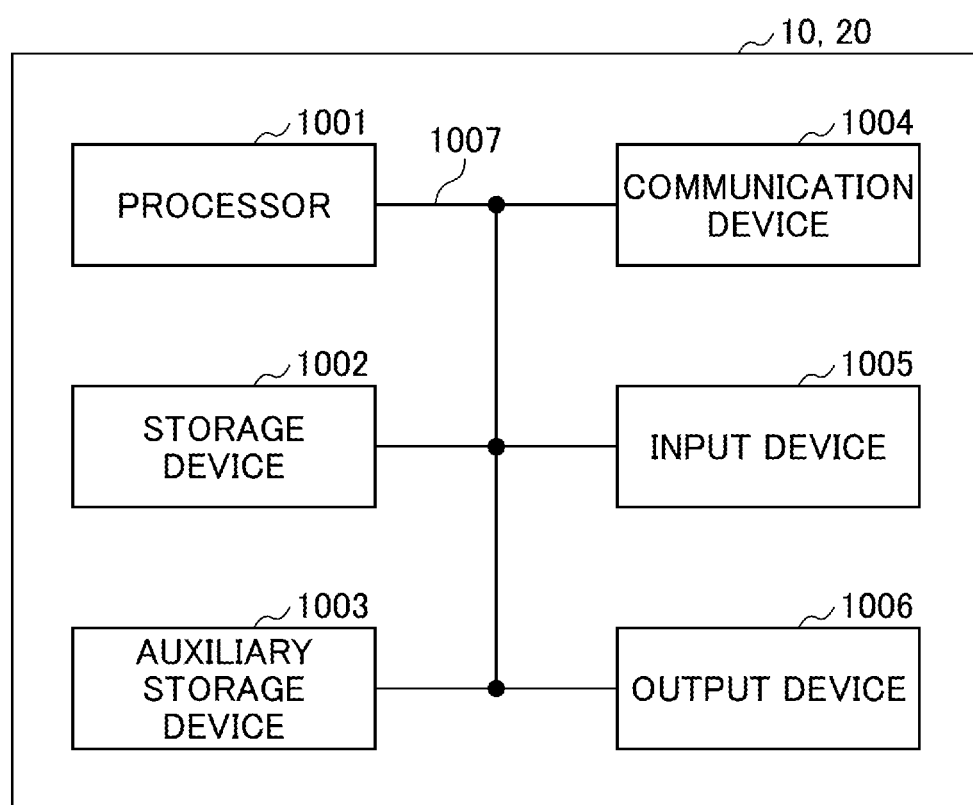
FIG. 17 is a diagram illustrating an example of a hardware configuration of the base station apparatus 10 or the user apparatus 20 according to an embodiment of the present invention.

For example, the base station apparatus 10, the user apparatus 20, or the like according to one embodiment of the present disclosure may function as a computer for processing a wireless communication method in the present disclosure. FIG. 17 is a diagram illustrating an example of a hardware configuration of the base station apparatus 10 and the user apparatus 20 according to one embodiment of the present disclosure. Each of the base station apparatus 10 and the user apparatus 20 may be physically configured as a computer device including a processor 1001, a storage device 1002, an auxiliary storage device 1003, a communication device 1004, an input device 1005, an output device 1006, a bus 1007, and the like.

Note that in the following description, the term "device" can be replaced with a circuit, a device, a unit, or the like. The hardware configuration of each of the base station apparatus 10 and the user apparatus 20 may be configured to include one or more devices illustrated in the drawings, or may be configured without including some devices.

Each function of the base station apparatus 10 and the user apparatus 20 is implemented such that predetermined software (program) is read on hardware such as the processor 1001 and the storage device 1002, and such that the processor 1001 performs operation to control communication by the communication device 1004; or controls at least one of reading and writing of data in the storage device 1002 and the auxiliary storage device 1003.

For example, the processor 1001 executes an operating system and controls the entire computer. The processor 1001 may be configured with a central processing unit (CPU) including an interface with a peripheral device; a control device; an arithmetic device; a register; and the like. For example, the control unit 140, the control unit 240, and the like described above may be implemented by the processor 1001.

Further, the processor 1001 reads a program (program code), a software module, or data, etc. from at least one of the auxiliary storage device 1003 and the communication device 1004, to the storage device 1002, and executes various types of processes according to them. A program that causes a computer to execute at least a portion of the operation described in the above embodiment is used as the program. For example, the control unit 140 of the base station apparatus 10 illustrated in FIG. 15 may be implemented by a control program that is stored in the storage device 1002, and that is executed by the processor 1001. Further, for example, the control unit 240 of the user apparatus 20 illustrated in FIG. 16 may be implemented by a control program that is stored in the storage device 1002 and that is executed by the processor 1001. Various types of processes have been described as using one processor 1001, but may be performed simultaneously or sequentially by two or more processors 1001. The processor 1001 may be implemented by one or more chips. Note that the program may be transmitted from a network via an electric communication line.

The storage device 1002 is a computer readable recording medium and may be configured with at least one of a read only memory (ROM), an erasable programmable ROM (EPROM), an electrically erasable programmable ROM (EEPROM), a random access memory (RAM), and the like. The storage device 1002 may be also referred to as a register, a cache, a main memory (main storage device), or the like. The storage device 1002 can store programs (program codes), software modules, or the like which are executable for carrying out the communication method according to one embodiment of the present disclosure.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage medium may be, for example, a database, a server, or any other appropriate medium, the database including at least one of the storage device 1002 and the auxiliary storage device 1003.

The communication device 1004 is hardware (a transceiving device) for performing communication between computers via at least one of a wired network and a wireless network, and is also referred to as, for example, a network device, a network controller, a network card, a communication module, or the like. The communication device 1004 may include a high-frequency switch, a duplexer, a filter, a frequency synthesizer, or the like in order to implement at least one of frequency division duplex (FDD) and time division duplex (TDD). For example, a transceiving antenna, an amplifying unit, a transmitting and receiving unit, a transmission line interface, or the like may be implemented by the communication device 1004. The transmitting and receiving unit may be implemented by a transmitting unit and a receiving unit being physically or logically separated.

The input device 1005 is an input device that receives an input from the outside (such as a keyboard, a mouse, a microphone, a switch, a button, a sensor, or the like). The output device 1006 is an output device that performs output to the outside (for example, a display, a speaker, an LED lamp, or the like). Note that the input device 1005 and the output device 1006 may be integrally configured (for example, a touch panel).

The devices such as the processor 1001 and the storage device 1002 are connected via the bus 1007 for communicating information. The bus 1007 may be configured with a single bus or be configured with a bus that differs with respect to devices.

Further, each of the base station apparatus 10 and the user apparatus 20 may be configured to include hardware such as a microprocessor, a digital signal processor (DSP), an application specific integrated circuit (ASIC), a programmable logic device (PLD), or a field programmable gate array (FPGA), or, all or some of the functional blocks may be implemented by hardware. For example, the processor 1001 may be implemented using at least one of these pieces of hardware.

Summary of Embodiments

As described above, according to the embodiment of the present invention, a user apparatus is provided, including: a control unit configured to apply in a specific order a plurality of processing rules for determining a channel as a transmission candidate by dropping a channel or multiplexing channels and repeat the application until detecting no channel collision in a time domain, in a case where a channel associated with a first service type and a channel associated with a second service type collide with each other at least in a time domain, and for at least one of the channel associated with the first service type and the channel associated with the second service type, a plurality of channels associated with a same service type collide with each other at least in the time domain; and a transmitting unit configured to transmit, to a base station apparatus, the channel as the transmission candidate for which no channel collision is detected in the time domain.

In such a configuration, the user apparatus 20 can apply a priority order that is set by the base station apparatus 10 or that is preset, to determine the channel to be transmitted, when the PUCCH associated with URLLC collides with other channel(s). In other words, in the wireless communication system, a communication control when channels collide with each other can be performed.

The first service type includes eMBB (enhanced Mobile Broadband), and the second service type may include URLLC (Ultra Reliable and Low Latency Communications). In such a configuration, the user apparatus 20 can perform control in which either of the eMBB or the URLLC is prioritized.

The control unit may determine the channel as the transmission candidate based on a first collision control, which is defined for the channel associated with the first service type and the channel associated with the second service type, and a second collision control, which is defined for channels associated with the first service type or channels associated with the second service type. In such a configuration, the user apparatus 20 can perform both of: control in which either of eMBB or URLLC is prioritized; and control in which any channel from among eMBB channels and URLLC channels is prioritized.

The control unit first applies the first collision control to determine a channel as the transmission candidate, and may next apply the second collision control to determine a channel as the transmission candidate. In such a configuration, the user apparatus 20 can first perform control in which either of eMBB or URLLC is prioritized.

The control unit first applies the second collision control to determine a channel as the transmission candidate, and may next apply the first collision control to determine a channel as the transmission candidate. In such a configuration, the user apparatus 20 can first perform control in which any channel from among eMBB channels and URLLC channels is prioritized.

Each of the channel associated with the first service type and the channel associated with the second service type may include a control channel or a data channel for which dropping or multiplexing is determined based on a UCI (Uplink Control Information) type. In such a configuration, the user apparatus 20 can perform control of dropping or multiplexing a channel, based on a UCI type, a PUCCH, or a PUSCH.

Supplement to Embodiment

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for description, but the numerical values are merely examples, and any suitable values may be used unless otherwise stated. The classification of items in the above description is not essential to the present invention, matters described in two or more items may be combined and used as necessary, and a matter described in one item may be applied to a matter described in another item (unless there is a contradiction). The boundary between functional units or processing units in a functional block diagram does not necessarily correspond to the boundary between physical parts. The operations of a plurality of functional units may be performed physically by one component, or an operation of one functional unit may be performed physically by a plurality of parts. In the processing procedures described in the embodiment, the order of processes may be changed as long as there is no inconsistency. For the sake of convenience of the process description, the base station apparatus 10 and the user apparatus 20 have been described using the functional block diagrams, but such apparatuses may be implemented by hardware, software, or a combination thereof. The software executed by the processor of the base station apparatus 10 according to the embodiment of the present invention, and the software executed by the processor of the user apparatus 20 according to the embodiment of the present invention, may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

The notification of information is not limited to the aspect/embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (MIB (Master Information Block), SIB (System Information Block)), other signals, or combinations thereof. The RRC signaling may be referred to as an RRC message and may be, for example, an RRC connection setup message, an RRC connection reconfiguration message or the like. The parameter that is transmitted via higher layer signaling may be referred to as a higher layer parameter.

Each aspect/embodiment described in the present disclosure may be applied to at least one from among LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), a system using other proper system, and next-generation systems that are extended based on these systems. Also, a combination of multiple systems (for example, a combination of at least one of LTE and LTE-A; and 5G, or, the like) may be applied.

In each aspect/embodiment described in the specification, the order of the procedure, the sequence, the flowchart, and the like may be changed as long as there is no contraction therebetween. For example, for the method described in the present disclosure, elements of various steps are presented in the illustrative order and are not limited to the specific order as presented.

In the specification, in some cases, the specific operation performed by the base station apparatus 10 may be also performed by an upper node of the base station apparatus. In a network that includes one or more network nodes including the base station apparatus 10, it is apparent that various operations performed for communication with the user apparatus 20 can be performed by at least one from among the base station apparatus 10 and another network node (for example, MME, S-GW, or the like is considered, but such a node is not limited thereto) other than the base station apparatus 10. In the above example, one network node is used as another network node other than the base station apparatus 10. However, a plurality of other network nodes (for example, MME and S-GW) may be combined.

Information, a signal, or the like described in the present disclosure may be output from an upper layer (or a lower layer) to a lower layer (or an upper layer). Information, a signal, or the like described in the present disclosure may be input and output via a plurality of network nodes.

Input and output information, and the like may be stored in a specific place (for example, a memory) or may be managed using a management table. Input and output information, and the like may be overwritten, updated, or additionally written. Output information, and the like may be deleted. Input information, and the like may be transmitted to another device.

The determination in the present disclosure may be performed in accordance with a value (0 or 1) expressed by one bit, be performed with a Boolean value (true or false), or be performed based on a comparison between numerical values (for example, a comparison with a predetermined value).

Software can be interpreted widely to mean a command; a command set; a code; a code segment; a program code; a program; a subprogram; a software module; an application; a software application; a software package; a routine; a subroutine; an object; an executable file; an execution thread; a procedure; a function; and the like, regardless of whether software is referred to as software, firmware, middleware, a microcode, a hardware description language, or, is referred to by any other name.

Further, software, commands, information, and the like may be transmitted and received via a transmission medium. For example, when software is transmitted from a web site, a server, or any other remote source, by using at least one from among a wired technology (such as a coaxial cable, a fiber optic cable, a twisted pair, or a digital subscriber line (DSL)) and a radio technology (such as infrared rays or a microwave), at least one of the wired technology and the radio technology is defined in the transmission medium.

Information, signals, and the like described in the present disclosure may be expressed using any of a variety of different techniques. For example, data, instructions, commands, information, signals, bits, symbols, chips, and the like which are mentioned throughout the description may be expressed by voltages, currents, electromagnetic waves, magnetic particles, optical fields, photons, or any combination thereof.

Note that the terms described in the present disclosure and terms necessary for understanding the present disclosure may be replaced with terms having the same or similar meanings. For example, at least one of a channel and a symbol may be a signal (signaling). Further, a signal may be a message. Further, a component carrier (CC) may be referred to as a carrier frequency, a cell, a frequency carrier, or the like.

The terms "system" and "network" used in the present disclosure are used interchangeably.

Further, information, parameters, and the like described in the present disclosure may be expressed using an absolute value, be expressed using a relative value from a predetermined value, or be expressed using corresponding other information. For example, the radio resource may be indicated by an index.

The names used for the above parameters are not limited in any respect. Further, mathematical formulas or the like using the parameters may be different from those explicitly disclosed in the present disclosure. Since various channels (for example, a PUCCH, a PDCCH, and the like) and information elements can be identified by any suitable names, various names for the various channels; and the information elements are not limited in any respect.

In the present disclosure, the terms "base station (BS)," "radio base station," "base station apparatus," "fixed station," "Node B," "eNode B (eNB)," "gNodeB (gNB)," "access point," "transmission point," "reception point," "transmission/reception point," "cell," "sector," "cell group," "carrier," "component carrier," and the like can be used interchangeably. The base station may also be referred to by the term such as a macro cell, a small cell, a femtocell, or a picocell.

The base station can accommodate one or more (for example, three) cells. In a case in which the base station accommodates a plurality of cells, the entire coverage area of the base station can be partitioned into a plurality of smaller areas, and each smaller area can provide a communication service through a base station subsystem (for example, a small indoor base station (Remote Radio Head (RRH)). The term "cell" or "sector" refers to all or some of the coverage area of at least one of the base station and the base station subsystem that provides a communication service in the coverage.

In the present disclosure, the terms "mobile station (MS)," "user terminal," "user equipment (UE)," "terminal," and the like can be used interchangeably.

The mobile station may be also referred to as, by those skilled in the art, a subscriber station; a mobile unit; a subscriber unit; a wireless unit; a remote unit; a mobile device; a wireless device; a wireless communication device; a remote device; a mobile subscriber station; an access terminal; a mobile terminal; a wireless terminal; a remote terminal; a handset; a user agent; a mobile client; or client, or be also referred to by some other suitable terms.

At least one of the base station and the mobile station may be also referred to as a transmitting device, a receiving device, a communication device, or the like.

Note that at least one of the base station and the mobile station may include a device installed in a mobile body, a mobile body itself, or the like. The moving body may be a vehicle (for example, a car, an airplane, or the like), a moving body that moves unmanned (for example, a drone, an autonomous car or the like), or a robot (manned type or unmanned type). Note that at least one of the base station and the mobile station includes a device that does not necessarily move during a communication operation. For example, at least one of the base station and the mobile station may be an IoT (Internet of things) device such as a sensor.

Further, the base station in the present disclosure may be replaced with a user terminal. For example, in each aspect/ embodiment of the present disclosure, a configuration in which communication between the base station and the user terminal is replaced with communication between a plurality of user apparatuses 20 (for example, which may be referred to as device-to-device (D2D), vehicle-to-everything (V2X)), or the like) may be applied. In this case, the user apparatus 20 may have the functions of the base station apparatus 10 described above. Further, the terms "uplink" and "downlink", etc. may be each replaced with a term (for example, "side") corresponding to inter-terminal communication. For example, an uplink channel, a downlink channel, or the like may be replaced with a side channel.

Similarly, the user terminal in the present disclosure may be replaced with the base station. In this case, the base station may have the functions of the above user terminal.

The term "determining" used in the present disclosure may cover a wide variety of actions. For example, "determining" may include, for example, events, etc., in which events such as judging, calculating, computing, processing, deriving, investigating, looking up, search, and inquiry (for example, search using a table, a database, or another data structure), or ascertaining are regarded as "determining." Further, "determining" may include, for example, events, etc., in which events such as receiving (for example, receiving information), transmitting (for example, transmitting information), input, output, or accessing (for example, accessing data in a memory) are regarded as "determining." Further, "determining" may include, for example, events in which events such as resolving, selecting, choosing, establishing, or comparing, etc. are regarded as "determining." In other words, "determining" may include events in which any operation is regarded as "determining." Further, "determining" may be replaced with "assuming," "expecting," "considering," or the like.

The term "connected," "coupled," or any modification thereof means any direct or indirect connection or coupling between two or more elements, and can cover the presence of one or more intermediate elements between two elements that are "connected" or "coupled" with each other. The coupling or the connection between the elements may be physical, logical, or a combination thereof. For example, "connection" may be replaced with "access." When used in the present disclosure, two elements can be considered to be "connected" or "coupled" with each other, by using at least one of: one or more electric wires; cables; and a printed electrical connection, or, by, as a non-limiting and non-exhaustive example, using electromagnetic energy that has a wavelength in radio frequency domain; a microwave region; or a light (both visible and invisible) region, etc.

A reference signal may be abbreviated as RS and may be referred to as a pilot, depending on a standard to be applied.

A phrase "based on" used in the present disclosure is not limited to "based on only" unless otherwise stated. In other words, the phrase "based on" means both of "based on only" and "based on at least."

Any reference to an element expressed using a designation such as "first," "second," or the like used in the present disclosure does not generally restrict quantities or an order of those elements. Such designations may be used in the present disclosure as a convenient method of distinguishing two or more elements. Thus, reference to the first and second elements does not mean that only two elements can be adopted, or that the first element must precede the second element in a certain form.

Further, "means" in the configuration of each of the above apparatuses may be replaced with "unit," "circuit," "device," or the like.

In the present disclosure, when "include," "including," and variations thereof are used, these terms are intended to be comprehensive, similarly to a term "equipped with (comprising)." Further, the term "or" used in the present disclosure is intended not to be an exclusive disjunction.

A radio frame may include one or more frames in the time domain. In the time domain, each of one or more frames may be referred to as a subframe. The subframe may further include one or more slots in the time domain. The subframe may have a fixed time length (for example, 1 ms) that is not in accordance with numerology.

The numerology may be a communication parameter applied to at least one of transmission and reception of a certain signal or channel. The numerology may indicate at least one from among, for example, SCS (SubCarrier Spacing), a bandwidth, a symbol length, a cyclic prefix length, a TTI (Transmission Time Interval), the number of symbols per TTI, a radio frame configuration, a specific filtering process performed in the frequency domain by a transceiver, a specific windowing process performed in the time domain by a transceiver, and the like.

The slot may include one or more symbols (OFDM (Orthogonal Frequency Division Multiplexing) symbols, SC-FDMA (Single Carrier Frequency Division Multiple Access) symbols, or the like) in the time domain. The slot may be a time unit based on the numerology.

The slot may include a plurality of mini-slots. Each mini-slot may include one or more symbols in the time domain. The mini-slot may be referred to as a sub-slot. The mini-slot may include a number of symbols smaller than a slot. The PDSCH (or PUSCH) transmitted by time unit greater than the mini-slot may be referred to as the PDSCH (or PUSCH) mapping type A. The PDSCH (or PUSCH) transmitted using the mini-slot may be referred to as the PDSCH (or PUSCH) mapping type B.

A radio frame, a subframe, a slot, a mini-slot, and a symbol each indicate a time unit in transmitting a signal. The radio frame, the subframe, the slot, the mini-slot, and the symbol may be each referred to by a corresponding other name.

For example, one subframe may be referred to as a transmission time interval (TTI), a plurality of consecutive subframes may be referred to as a TTI, or one slot or one mini-slot may be referred to as a TTI. In other words, at least one of the subframe and the TTI may be a subframe (1 ms) in existing LTE, include a period (for example, 1 to 13 symbols) shorter than 1 ms, or include a period longer than 1 ms. Note that a unit expressed as the TTI may be referred to as a slot, a mini-slot, or the like, instead of the subframe.

Here, for example, the TTI refers to a minimum time unit for scheduling in wireless communication. For example, in an LTE system, the base station performs scheduling in which a radio resource (a frequency bandwidth, a transmission power, or the like that can be used for each user apparatus 20) is allocated to each user apparatus 20, by TTI unit. Note that the definition of the TTI is not limited to the above manner.

The TTI may be used as a transmission time unit for a channel coded data packet (transport block), a code block, a code word, or the like, or, be used as a processing unit for scheduling, link adaptation, or the like. Note that when a TTI is given, a time interval (for example, the number of symbols) at which a transport block, a code block, a code word, or the like is actually mapped may be shorter than the TTI.

Note that when one slot or one mini-slot is referred to as the TTI, one or more TTIs (that is, one or more slots, or, one or more mini-slots) may be used as a minimum time unit for scheduling. Further, the number of slots (the number of mini-slots) that constitute the minimum time unit for scheduling may be controlled.

A TTI having a time length of 1 ms may be referred to as a common TTI (TTI in LTE Rel. 8-12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini-slot, a sub-slot, a slot, or the like.

Note that the long TTI (for example, a common TTI, a subframe, or the like) may be replaced with a TTI having a time length exceeding 1 ms, and the short TTI (for example, a reduced TTI, or the like) may be replaced with a TTI having a TTI length that is shorter than a TTI length of the long TTI, and that is equal to or longer than 1 ms.

The resource block (RB) is used as a resource allocation unit in time domain and frequency domain, and may include one or more consecutive subcarriers in the frequency domain. The number of subcarriers included in the RB may be same, regardless of a numerology, and be, for example, 12. The number of subcarriers included in the RB may be determined based on the numerology.

Further, a time domain of the RB may include one or more symbols, and may have a length of one slot, one mini-slot, one subframe, or one TTI. One TTI, one subframe, or the like may be configured with one or more resource blocks.

Note that one or more RBs may be referred to as a physical resource block (PRB), a sub-carrier group (SCG), a resource element group (REG), a PRB pair, an RB pair, or the like.

Further, the resource block may be configured with one or more resource elements (REs). For example, one RE may be a radio resource domain of one subcarrier and one symbol.

A bandwidth part (BWP) (which may be referred to as a partial bandwidth, or the like) may indicate a subset of consecutive common resource blocks (RBs) for certain numerology, on a certain carrier. Where, the common RB may be specified by an RB index with reference to a common reference point in a given carrier. The PRB is defined by a certain BWP, and may be numbered in the BWP.

The BWP may include a BWP (UL BWP) for UL and a BWP (DL BWP) for DL. For UE, one or more BWPs may be configured in one carrier.

At least one of configured BWPs may be active, and UE may not be assumed to transmit and receive a predetermined signal/channel, except for the active BWP. Note that the "cell," the "carrier," or the like in the present disclosure may be replaced with the "BWP."

The structures of the above radio frame, the subframe, the slot, the mini-slot, the symbol, and the like are merely examples. For example, the configurations, such as the number of subframes included in a radio frame; the number of slots per subframe or radio frame; the number of mini-slots included in a slot; the number of each of symbols and RBs, the symbols being included in a slot or a mini-slot; the number of sub-carriers included in an RB; the number of symbols in a TTI; a symbol length; a cyclic prefix (CP) length; and the like, can be variously changed.

In the present disclosure, for example, when an article such as "a," "an," or "the" in English is added by translating, the present disclosure may include a case in which a noun following the article is in the plural.

In the present disclosure, the expression "A and B are different" may mean "A and B are different from each other." Note that the expression may mean "each of A and B is different from C." Terms such as "separated," "coupled," or the like may be also interpreted, as is the case with "different."

Each aspect/embodiment described in the present disclosure may be used alone or in combination, or be switched according to the execution. Further, notification of predetermined information (for example, notification of "being X") is not limited to being performed explicitly, and may be performed implicitly (for example, the predetermined information is not indicated). The present disclosure has been described above.

It would be apparent to those skilled in the art that the present disclosure is not limited to the embodiment described in the present disclosure. Modifications and changes of the present disclosure can be made without departing from a spirit and scope of the present disclosure set forth in the claims. Therefore, the description of the present disclosure is provided for illustrative purposes, and is not intended to limit the present disclosure.

REFERENCE SIGNS LIST

10 BASE STATION APPARATUS
110 TRANSMITTING UNIT
120 RECEIVING UNIT
130 SETTING UNIT
140 CONTROL UNIT
20 USER APPARATUS
210 TRANSMITTING UNIT
220 RECEIVING UNIT
230 SETTING UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:
a processor configured to perform first collision control between transmissions of channels having lower priority, and then, perform second collision control in a case where a collision occurs between transmissions of channels having different priority; and
a transmitter configured to transmit a channel determined based on the first collision control and the second collision control to a base station,
wherein the processor performs third collision control in a case where a collision occurs between transmissions of channels having higher priority after performing the second collision control in the case where the collision occurs between the transmissions of channels having different priority; and
the transmitter transmits a channel determined based on the third collision control to the base station.

2. The terminal according to claim 1, wherein, in the first collision control, the processor multiplexes uplink channel control information of a channel having lower priority with uplink channel control information of the channel having lower priority.

3. The terminal according to claim 1, wherein, in the second collision control, the processor cancels a channel having lower priority.

4. The terminal according to claim 1, wherein, in the third collision control, the processor multiplexes uplink channel control information of a channel having higher priority with uplink channel control information of a channel having higher priority.

5. The terminal according to claim 2, wherein the multiplexing is performed with a same procedure for all priorities.

6. The terminal according to claim 4, wherein the multiplexing is performed with a same procedure for all priorities.

7. A communication system comprising: a terminal; and a base station, wherein
the terminal includes:
a processor configured to perform first collision control between transmissions of channels having lower priority, and then, perform second collision control in a case where a collision occurs between transmissions of channels having different priority; and
a transmitter configured to transmit a channel determined based on the first collision control and the second collision control to the base station,
wherein the processor performs third collision control in a case where a collision occurs between transmissions of channels having higher priority after performing the second collision control in the case where the collision occurs between the transmissions of channels having different priority; and
the transmitter transmits a channel determined based on the third collision control to the base station, and
the base station includes:
a receiver configured to receive the channel determined based on the first collision control and the second collision control from the terminal.

8. A communication method of a terminal, the communication method comprising:
performing first collision control between transmissions of channels having lower priority, and then, performing second collision control in a case where a collision occurs between transmissions of channels having different priority;
transmitting a channel determined based on the first collision control and the second collision control to a base station;
performing third collision control in a case where a collision occurs between transmissions of channels having higher priority after performing the second collision control in the case where the collision occurs between the transmissions of channels having different priority; and transmitting a channel determined based on the third collision control to the base station.

* * * * *